US010068308B2

(12) United States Patent
Seiler

(10) Patent No.: US 10,068,308 B2
(45) Date of Patent: Sep. 4, 2018

(54) LOSSY DEPTH COMPRESSION OF MULTI-SAMPLE PIXELS

(71) Applicant: Intel Corporation, Santa Clara, CA (US)

(72) Inventor: Larry Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 15/167,798

(22) Filed: May 27, 2016

(65) Prior Publication Data

US 2017/0345120 A1    Nov. 30, 2017

(51) Int. Cl.
| | |
|---|---|
| *G06T 1/20* | (2006.01) |
| *G06T 1/60* | (2006.01) |
| *G06T 11/00* | (2006.01) |
| *G06T 15/04* | (2011.01) |
| *G06T 17/20* | (2006.01) |
| *G06T 11/40* | (2006.01) |
| *G06T 15/08* | (2011.01) |

(52) U.S. Cl.
CPC ............... *G06T 1/20* (2013.01); *G06T 1/60* (2013.01); *G06T 11/001* (2013.01); *G06T 15/04* (2013.01); *G06T 11/40* (2013.01); *G06T 15/08* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 6,630,933 B1 * | 10/2003 | Van Hook | ............... | G06T 9/001 345/422 |
| 7,817,165 B1 * | 10/2010 | Donham | ................ | G09G 5/363 345/611 |
| 2014/0105513 A1 * | 4/2014 | Schneider | ................ | G06K 9/36 382/238 |

OTHER PUBLICATIONS

Larry, Seiler, "Bandwidth-Efficient Lossy Fragment Color Compression of Multi-Sample Pixels", U.S. Appl. No. 15/167,717, filed May 27, 2016, 129 Pages.
Larry, Seiler, "Planar Depth Representations for Block Compression", U.S. Appl. No. 15/167,865, filed May 27, 2016, 93 Pages.

* cited by examiner

*Primary Examiner* — Saptarshi Mazumder
(74) *Attorney, Agent, or Firm* — Schiff Hardin LLP

(57) ABSTRACT

Described herein are technologies related to facilitating lossy compression for multi-sampled depth data of computer graphics that maximizes the apparent quality of pixels while avoiding a corresponding burden on memory and processor bandwidth. The technologies described herein provide high-quality multi-sampling for pixels or groups of pixels that are covered by a small number of triangles, and provides a guaranteed minimum quality for pixels that are covered by a large number of triangles.

17 Claims, 21 Drawing Sheets

16 Sample Pattern

8 Sample Pattern

4 Sample Pattern

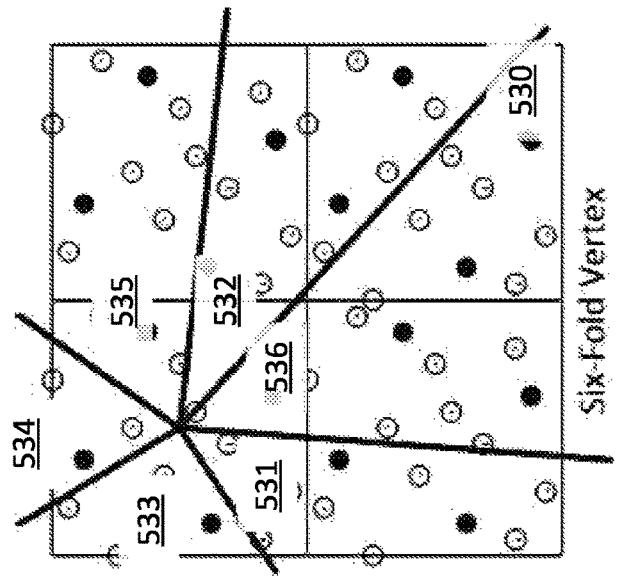
FIG. 5C  Six-Fold Vertex
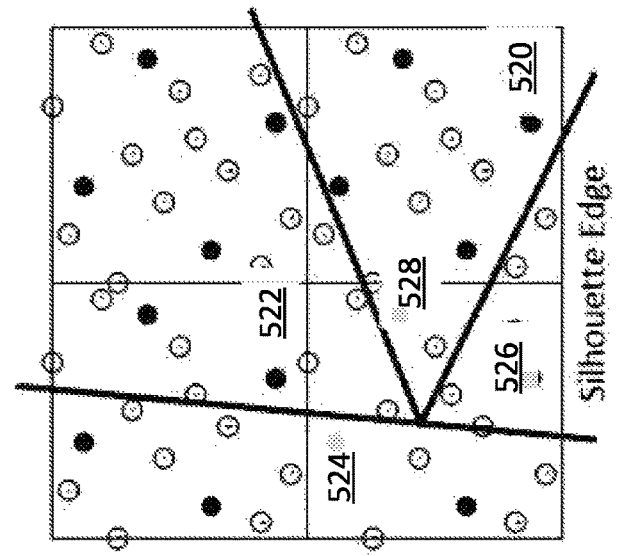
FIG. 5B  Silhouette Edge
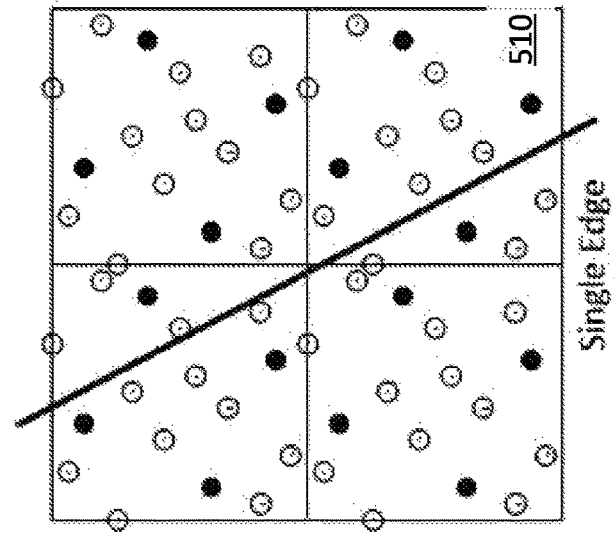
FIG. 5A  Single Edge

FIG. 6

Z Plane Mode, 4x4 Pixels (Row 1: Two 112-bit Z Planes or Three 85-bit Z Planes | Two 112-bit Z Planes or Three 85-bit Z Planes)

(Row 2: 4-bit Mask × 16)

610

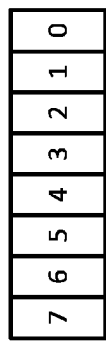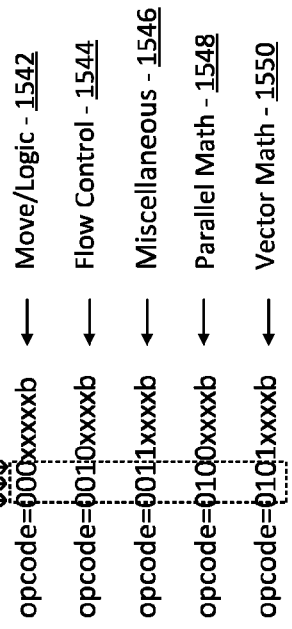
FIG. 15

FIG. 17A GRAPHICS PROCESSOR COMMAND FORMAT
1700
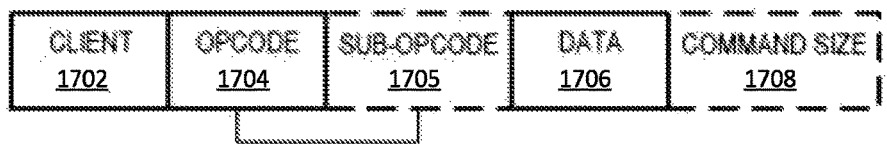
FIG. 17B GRAPHICS PROCESSOR COMMAND SEQUENCE
1710
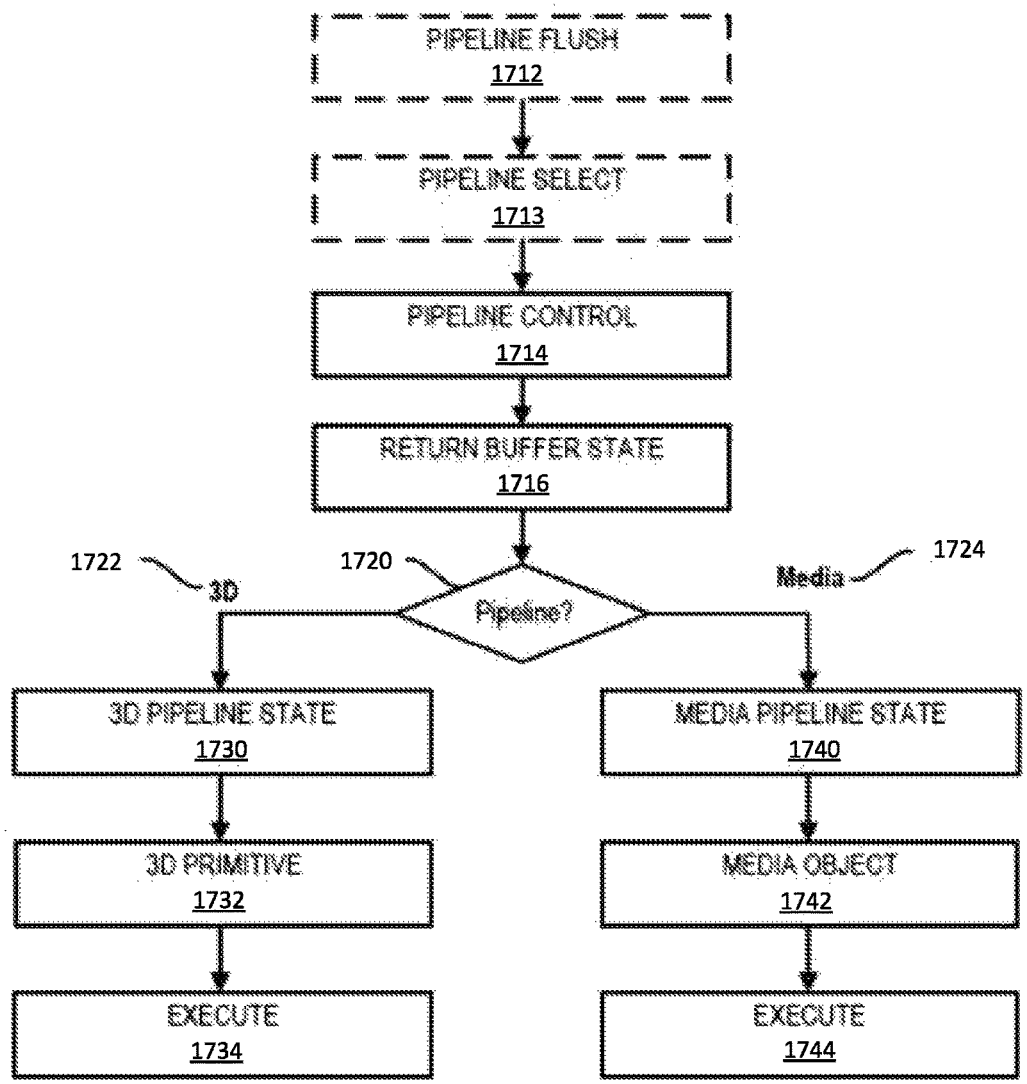

LOSSY DEPTH COMPRESSION OF MULTI-SAMPLE PIXELS

BACKGROUND

The quality of a rendered image is significantly improved with anti-aliasing. In computer graphics, aliasing is the process by which smooth curves and angled lines appear to be jagged because the resolution of the graphics device or file is not high enough to represent a smooth curve or angled lines. Many conventional anti-aliasing techniques exist to reduce aliasing effects (e.g., jagged lines following boundaries between pixels) in rendering a two-dimensional (2D) image of the three-dimensional (3D) object(s).

Super-sampling and multi-sampling are two common conventional anti-aliasing techniques. Super-sample anti-aliasing (SSAA) involves generating multiple samples within a pixel, where each sample is independently computed for coverage and shading. The shaded samples are stored within a frame buffer and blended for display. While super-sampling produces a very accurate and high-quality image, super-sampling is quite expensive because each pixel within a rendered image requires the computational processing of multiple fully shaded samples, and shading is typically the most expensive operation within the graphics rendering engine.

Typically, a depth value (sometimes also called a Z value) is also associated with each sample in 3D graphics rendering. The depth value specifies the distance from the scene viewpoint of the object being rendered at that sample location. When multiple opaque objects overlap, comparing their depth values allows determining which object's color should be visible at that sample location.

Typically, objects in a 3D scene are represented by drawing triangles that approximate the surfaces of the objects. A depth value is calculated at each vertex of the triangle and is interpolated to find depth values at sample locations covered by the triangle. This depth value indicates the relative distance the sample is from the viewpoint of the scene. The "Z" relates to a convention that the central axis of the view of the "camera" (or viewer) is in the direction of the camera's Z axis (rather than the absolute Z axis of a scene). Since three points determine a plane, the sample depth values are all positions on a plane. This is sometimes called the Z-plane of the triangle.

Multi-sample anti-aliasing (MSAA) techniques are a less expensive technique that uses one fully shaded color value and a coverage mask, rather than multiple fully shaded samples, to generate the multiple samples stored in the frame buffer that is ultimately blended to produce a pixel within a rendered image. Multi-sampling is commonly used because of the substantial cost-versus-performance benefit that is typically achieved without a significant loss in overall image quality. Although multi-sampling saves shader processing relative to super-sampling, multi-sampling still requires a frame buffer with multiple samples per pixel and the attendant bandwidth, which can limit application performance. These MSAA techniques are designed to store separate depth and color data values for each sample within a pixel when needed.

While effective in compressing color values of the samples of a multi-sample pixel, MSAA (and other similar techniques) do not compress the depth value of the samples of such a pixel. With a multi-sampled pixel, multiple samples may have the same color value, which permits efficient compression, but in general each depth sample has a different depth value. Depth values are difficult to compress effectively both because they differ at each sample within a pixel and because they are stored using 16-bit to 32-bit values, unlike color components which are typically stored using 8-bit values.

BRIEF DESCRIPTION OF THE DRAWINGS

FIGS. 5A-C illustrate examples of how primitive (e.g., triangle) meshes may cover 2×2 pixel quads of 16× multi-sample pixels.

FIG. 6 illustrates an example of a lossy depth compression format that encodes depth values for a 4×4 block of multi-sample pixels.

FIG. 15 is a block diagram illustrating a graphics processor execution unit instruction format according to an embodiment.

FIG. 17A is a block diagram illustrating a graphics processor command format according to an embodiment and FIG. 17B is a block diagram illustrating a graphics processor command sequence according to an embodiment.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
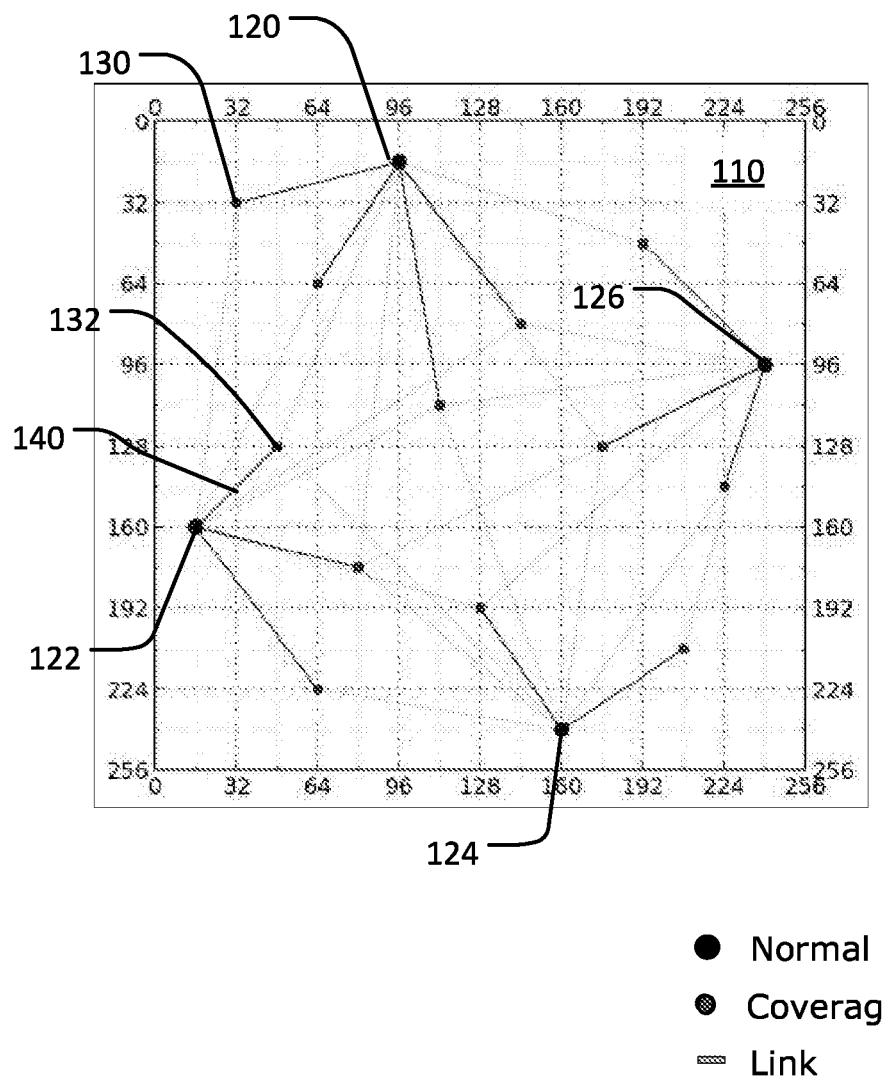
FIG. 1 illustrates an example of a conventional CSAA pixel with sixteen samples.

Described herein are technologies to facilitate lossy compression for multi-sampled depth data of computer graphics that maximizes the apparent quality of pixels while avoiding a corresponding burden on memory and processor bandwidth. The technologies described herein provide high-quality multi-sampling for pixels or groups of pixels that are covered by a small number of triangles, and provides a guaranteed minimum quality for pixels that are covered by a large number of triangles. For example, pixels covered by a small number of triangles could be rendered with 16 depth sample values per pixel, whereas more complex pixels could be guaranteed 4× multi-sample quality. The technologies described herein eliminate pop-through artifacts and the results are not dependent upon tessellated triangle order or when caches are flushed.

As a result, high multi-sample counts (e.g., greater than 4×) can be supported by most multi-sampled pixels (i.e., MS-pixels) of a computer graphics image while using the same or nearly the same memory resources as 4×MSAA techniques. Many applications that use conventional multi-sampling do not attempt greater than 4× because of the increased demand for memory and processing resources by the greater number of samples per MS-pixel (e.g., 8× or 16×).

Each sample of an MS-pixel has specified fixed location within the pixel and also has sample data associated therewith. The sample data typically includes depth and color, and may also include other data computed for that sample position. Depth is typically stored in a separate memory array from color.

The technologies described herein store multi-sample pixels as either a depth value for each of the few samples per pixel (e.g., 4 or 8) or else as one or more Z-planes to encode depths for the many samples per pixel (e.g., 16). Each Z-plane specifies the depths for a single primitive (e.g., triangle) that overlaps the pixel. Masks specify which Z plane is used for each sample. The sample mask includes an "invalid" encoding for each sample. If too many triangles overlap a pixel, the less important Z-planes are discarded and their samples are marked invalid. Depth operations that affect the color buffers mark a color sample invalid if the corresponding depth sample is invalid. These invalid samples are ignored when the pixel is resolved.

For the Z-planes that are kept, the technologies described herein define an order of importance of the samples. If there are too many Z planes, the technologies described herein determine the minimum sample priority (i.e., a minimum sample threshold) covered by each Z-plane. The Z-planes that do not have at least one sample with a sufficient priority are discarded. As a result, the selection of which Z-planes to discard does not depend on cache flushes and so is guaranteed to produce the same results independent of caching.

At least one implementation of the technologies guarantees a minimum quality for each pixel by assuring that highest priority samples (e.g., the top four) are always covered. If the Z-planes that are able to be stored in the memory representation do not cover them, then the pixel is converted from Z-plane form to sample form. Thus, the described technologies store the individual depths at each sample. This guarantees a minimum of 4× MSAA quality level for all pixels. Of course, other implementations may guarantee other levels of minimum quality (e.g., 2× or 8×).

Alternatives of the technologies described herein offer multi-pixel compression modes, varying the number of Z-planes, and providing varying minimum quality levels.

A pixel is simply a colored dot of a computer graphics image or frame that will ultimately be displayed on a screen. A multi-sampled pixel (MS-pixel) is a pixel that has multiple (e.g., 2×, 4×, 8×) sample values (e.g., color and depth) associated with it. Unless the context indicates otherwise, presume the term "pixel" used herein is a multi-sampled pixel (MS-pixel) of computer graphics.

Super-Sampling

The quality of a rendered image is significantly improved with anti-aliasing. In computer graphics, aliasing is the process by which smooth curves and angled lines appear to be jagged because the resolution of the graphics device or file is not high enough to represent a smooth curve or angled lines. Many conventional anti-aliasing techniques exist to reduce aliasing effects (e.g., jagged lines following boundaries between pixels) in rendering a two-dimensional (2D) image of the three-dimensional (3D) object(s).

The simplest sampling-based anti-aliasing approach performs all of the necessary rendering calculations on all of the samples (e.g., 16 samples per pixel) for each pixel of an image. While this is highly effective at removing aliasing artifacts, it is impractical. It is expensive regarding computational and memory resources. It increases the pixel shading, rasterization, memory bandwidth, and memory capacity requirements many times per sample. The conventional techniques where all computations are carried out for each sample in this fashion are called super-sample anti-aliasing (SSAA).

Super-sampling involves generating multiple samples within a pixel, where each sample is independently computed for coverage and shading. The shaded samples are stored in a frame buffer and blended for display. While super-sampling produces a very accurate and high-quality image, super-sampling is quite expensive because each pixel within a rendered image requires the computational processing of multiple fully shaded samples, and shading is typically the most expensive operation in the graphics rendering engine.

Typically, in SSAA, a selected number of samples per pixel of the final 2D image is selected (e.g., 2, 4, 8 or 16), and that number of samples are computed for the 3D object(s) for each pixel within the image plane of the final 2D image. Each sample specifies a color and other data associated with the pixel to which that sample belongs. The various colors of the samples of each pixel are employed to derive the colors given to each pixel in the final 2D image.

Unfortunately, SSAA techniques are demanding of both memory and processor bandwidth since an entirely separate color data value is always computed and stored for each sample. To gain the benefits of sampling at a finer resolution without such high memory/processor bandwidth requirements, conventional multi-sampling anti-aliasing (MSAA) techniques are used.

Multi-Sampling

Multi-sample anti-aliasing (MSAA) techniques offer an improvement over SSAA. Unlike the SSAA case, when processing a 3D object, only a single color is computed for each pixel overlapped by the object. That color is used for all samples in the pixel that are covered by the 3D object. But the coverage is computed once per sample, allowing for the same anti-aliasing quality regarding geometry edges as SSAA. This dramatically reduces the computation required for anti-aliasing but does not reduce the memory bandwidth requirement. Multi-sampling is commonly used because of the substantial cost-versus-performance benefit that is typically achieved without a significant loss in overall image quality.

Multi-sample fragment compression reduces the memory bandwidth required for MSAA color data. Instead of replicating the fragment color to each sample marked in the fragment's sample mask, fragment compression stores the fragment colors and their sample masks. As a result, if a color covers N samples, it only needs to be accessed once (along with the coverage information) instead of N times. The coverage information is typically encoded as a fragment number per sample and is usually stored in a separate array called a control plane.

MSAA techniques are classified based on the number of samples designated per pixel. Theoretically, the higher the resolution of the MSAA technique, the better it is as anti-aliasing. Thus, it is better quality. A 2×MSAA has two samples per pixel. A 4×MSAA has four samples per pixels. 8× and 16×MSAA is also used, though above that number of samples there is typically very little perceived quality improvement from using more samples.

Not surprisingly, the improved quality comes at the cost of increased memory bandwidth demands, even with the benefits of MSAA fragment compression. Also, fragment compression does not reduce the memory footprint but instead increases it due to needing to store mapping data. 4× MSAA is commonly used as a balance between the benefit of increasing visual quality and the cost of increased memory bandwidth and memory footprint, although aliasing artifacts are still clearly visible. 4× MSAA also balances the amount of metadata required, which is N*log(N) bits per pixel. For 4-sample, this is 8 bits per pixel. For 8-sample, this increases to 24-bits per pixel of metadata, which usually is stored as 32-bits because of the complexity of accessing memory words that are not a power of two in size.

A pixel is simply a colored dot of a computer graphics image or frame that will ultimately be displayed on a screen. A multi-sample pixel (MS-pixel) is a pixel that has multiple (e.g., 2×, 4×, 8×) sample values (e.g., color) associated with it. Unless the context indicates otherwise, presume the term "pixel" used herein is a multi-sample pixel (MS-pixel) of computer graphics.

CSAA and EQAA

With the goal of improving on MSAA (esp. regarding anti-aliasing and bandwidth/storage performance), NVIDIA Corporation introduced CSAA (coverage sampling anti-aliasing), and AMD introduced EQAA (enhanced quality anti-aliasing). CSAA and EQAA improve anti-aliasing over MSAA by introducing additional coverage samples, which do not store color, depth or stencil values, but rather a link to one of the normal samples. Meta-data bits specify which links are valid. The number of depths that can be represented is limited to the number of normal samples, but anti-aliased coverage is computed based on the total number of normal plus coverage samples. This results in quality similar to MSAA with the total number of samples, provided that not too many triangles or other primitives overlap the pixel.

FIG. 1 illustrates an example CSAA pixel 110 with sixteen samples. The example pixel 110 uses a CSAA 4+12 pattern. That pattern includes four (4) normal samples (120, 122, 124, 126) and twelve (12) coverage samples (e.g., 130, 132). In this example, the normal samples represent the MSAA samples for a 4× multi-sample pixel. The grid of coverage plus normal samples (e.g., 130 and 132) is of higher resolution than the grid of normal samples used by MSAA (e.g., 120 and 122) and so provides a higher resolution indication as to if a part of a given pixel is covered by a given primitive.

For color processing, links specify what fragment color to use for the coverage samples, by associating samples that are covered by the same triangle. Each coverage sample (e.g., 132) is linked to one or more of the normal samples (e.g., 122) and to zero or more other coverage samples. Line 140 is a visual representation of such a link. The lines represent all of the possible links. For this example, this pattern requires at least 24 bits per pixel to store the links, in addition to the bits that are necessary for fragment compression. Links are broken, that is, the associated link bit is set to zero, when two samples are not covered by the same triangle. This may result in a coverage sample not being associated with a normal sample. CSAA and EQAA make different assumptions about what color fragment to use in such cases, but the actual color at the unlinked coverage sample is lost.

Depth testing with CSAA and EQAA is problematic because depth tests must be performed at every sample, whereas CSAA and EQAA only store depth values for the normal samples. CSAA performs depth tests only for the normal samples and uses the results for a covered normal sample for nearby coverage samples. EQAA performs a depth test at each sample using the depth of the triangle, replicating the stored depths at normal samples to nearby coverage samples. Other methods could be devised. All of them suffer from the problem that correct depth tests cannot be performed at coverage samples because there is no depth value stored for coverage samples. This limitation can cause a variety of visible artifacts when triangles overlap and have similar depths.

In addition, the conventional approaches (e.g., CSAA and EQAA) require a significant amount of meta-data in order to store the coverage sample and a multi-sample. For example, ordinary 4-sample fragment compression requires four 2-bit values per pixel. The CSAA 4+12 pattern illustrated in FIG. 1 requires an additional 24 bits per pixel to specify whether each of the links is active, for a total of 32-bits of meta-data per pixel. This is a particular burden for the common case when only one triangle covers the entire pixel.

Unlike those approaches, the technologies described herein do not require link bits and store Z-plane masks in the pixel storage format in order to provide stored depth values for coverage samples. With this, only a few bits (e.g., 1 or two) of meta-data is typically used per multi-sampled pixel in order to select the specific compression format used at that pixel. Additionally, the technologies described herein store a representation of depth values at coverage samples and only perform depth tests when a depth value is available, otherwise setting the sample to invalid. This avoids the artifacts caused by CSAA and EQAA due to their performing depth tests at coverage samples for which no depth value is available. Finally, for CSAA and EQAA the order in which the tessellated triangles (which are examples of primitives) are rendered affects the resulting pixel color since the triangle ordering can result in different links being broken. With the new technologies described herein, that is not the case.

Lossy Depth Compression

The technology described herein uses a meta-data value per pixel or per block of pixels to specify the compression format uses for that pixel or pixels. The meta-data can select storing individual depth sample values or storing Z-planes that represent the depth value at multiple samples. These compression methods guarantee depth values for a minimum guaranteed set of sample positions, which are called the normal samples. Depending on the complexity of the triangles covering the pixel or pixels, these compression methods allow up to a maximum number of additional samples to specify depth values. These are called the coverage samples.

Figure 2:
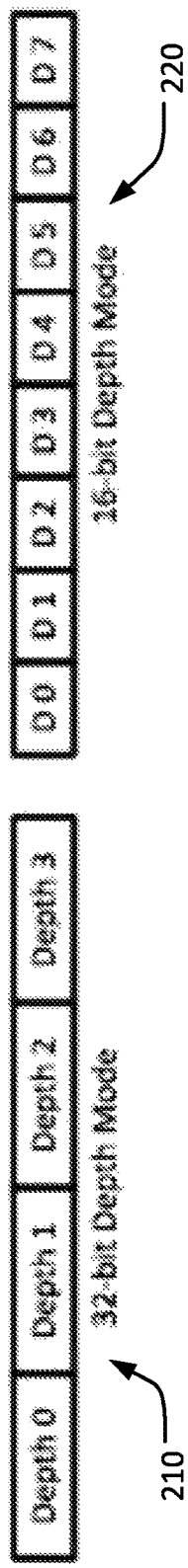
FIG. 2 illustrates two example formats in which sample data values (e.g., depth values) are stored for a multi-sample pixel.

FIG. 2 shows two example formats in which sample data values (e.g., depth values) are stored for a multi-sample pixel. These formats are examples of storing depth value in sample mode. One or more implementations described herein allows higher multi-sample rates when depths are specified using Z-planes to compute the per-sample depths depending upon which triangle overlaps each of the lower priority of samples. Pixels that cannot be effectively represented as Z-planes are stored as individual depths for the highest priority samples, which are the normal samples. If so, the normal samples are stored in the sample mode, as shown FIG. 2.

The example format 210 defines a structure for storing sample data (e.g., depth) for four samples (which are labeled Depth 0-3) of a 4× multi-sample pixel. With this format 210, four per-sample values are stored in a structured and defined format with each depth value using 32-bits.

While this sample mode format 210 is used with traditional 4×MS-pixels, this format is also used for a sample mode for encoding the top-prioritized four depths of a higher sampled (e.g., 8× or 16×) lossy compressed pixel. So, format 210 is also an example of a format for storing compressed sample data (e.g., depth) for a multi-sample pixel that is greater than 4×. Thus, the format 210 is used in accordance with the technologies described herein.

The example format 220 defines a structure for storing sample data (e.g., depth) for eight samples (which are labeled D 0-7) of an 8× multi-sample pixel. With this format 220, eight per-sample values are stored in a structured and defined format with each depth value using 16-bits.

While this sample mode format 220 is used with traditional 8× pixels, this format is also used for a sample mode for encoding the top-prioritized eight depths of a higher sampled (e.g., 16×) pixel. So, format 220 is also an example of a format for storing compressed sample data (e.g., depth) for a multi-sample pixel that is greater than 8×. Thus, the format 220 is used in accordance with the technologies described herein.

Figure 3:
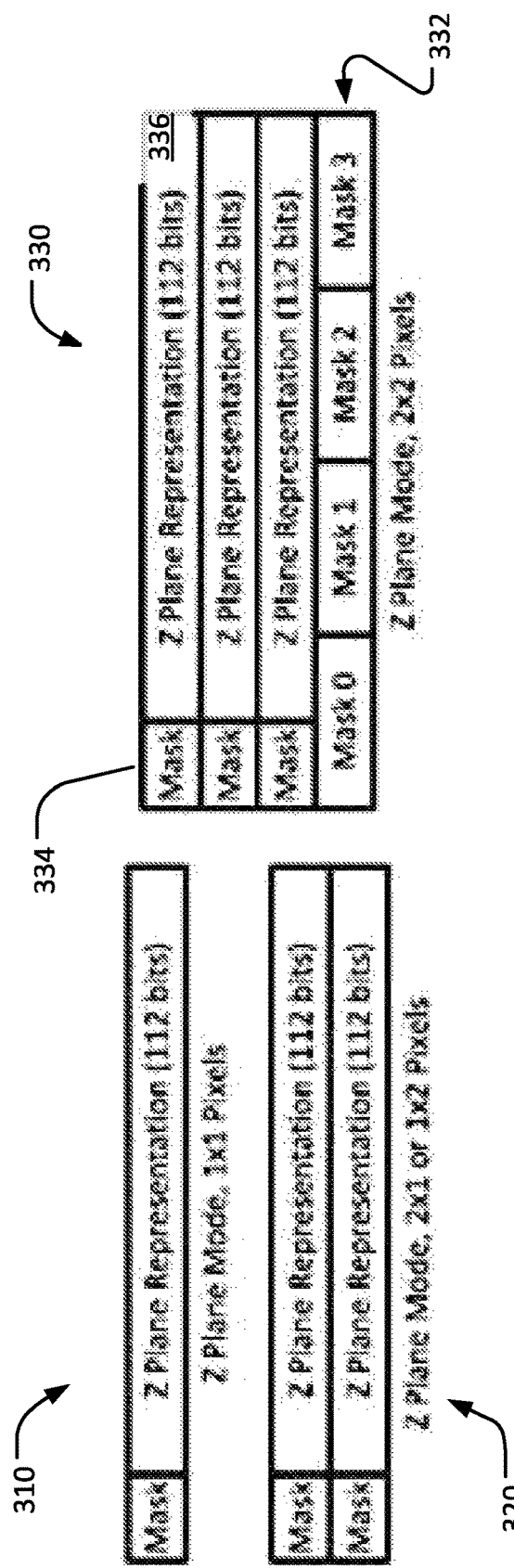
FIG. 3 illustrates three example formats for representing a single or a block of multi-sample pixels using Z-planes.

FIG. 3 shows three example formats for representing a single or a block of multi-sample pixels using Z-planes. These formats are used for Z-plane mode. For illustration purpose, these examples presume a 16× pixel and that the depth value of each Z-planes is represented using 112 bits. Of course, alternative implementations and another number of samples may utilize other lengths or sizes of bits for a Z-plane.

Example format 310 is a Z-plane representation for a single (1×1) pixel. The format 310 includes a 16-bit mask that specifies whether to use the Z-plane depth value or a fast clear depth value at each of the sixteen samples of a 16× pixel. This format 310 is especially effective when a triangle completely covers the pixel and, for initial rendering, when the pixel is partially covered by the fast clear depth. If more than one triangle covers the pixel, the per-sample depth mode above may be used instead.

Example format 320 is a Z-plane representation for a double (2×1 or 1×2) pixel block. The format 320 includes a 16-bit mask for each pixel of the block. That is, the format provides a 1-bit mask for each of the 32 samples in the two 16× pixels of the block. This mask selects which of the two planes to use at each sample. This format 320 is particularly effective if two triangles fully cover the two pixels of the block.

Example format 330 is a Z-plane representation for a quad (2×2) pixel block. This format 330 specifies three Z-planes. Stored in area 332 labeled Masks 0-3, the format 330 provides a 2-bit mask per sample. These masks select either the fast clear depth or one of the three Z-planes for each of the 16 samples per pixel.

Format 330 also allows for "invalid" samples. The three 16-bit masks stored with the Z-planes (e.g., mask 334 with Z-plane 336) specify a total of 48-bits, which may be used to specify whether each of the 12 coverage samples per pixel are invalid. That is, for each sample of the block of pixels, one or more implementations use the mask (e.g., mask 334) to associate the sample with one of the three Z-planes of this format (as determined by masks 332) or to specify an invalid depth value. The mask bits 332 could also select the depth clear value.

A depth is specified for each of the normal (i.e., "top-priority") samples. For example, for a 4× pixel, a depth is specified for each of the four primary samples and, for an 8× pixel, a depth is specified for each of the eight primary samples.

When this cannot be done with Z-planes for a pixel, then individual depths are stored for the normal samples. This is, sample mode is used. The Z-planes that do not cover those normal sample locations are discarded and the samples covered by the discard Z-planes are marked as "invalid." Invalid depth samples disable both stencil and color processing operations that depend upon the depth test.

Figure 4C:
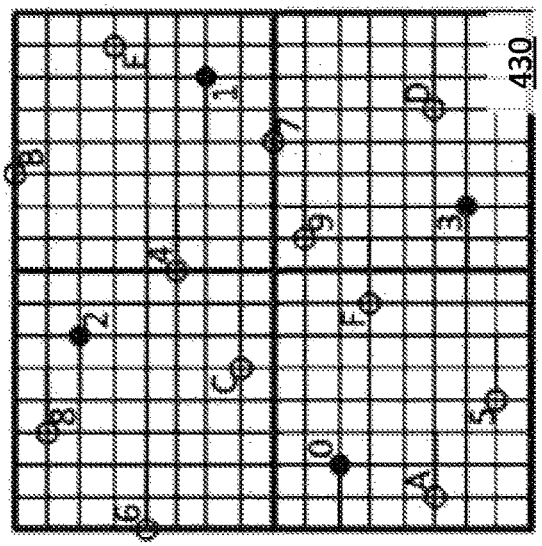
FIGS. 4A-C illustrate examples of a way to define 4×, 8×, and 16× sample patterns, respectively, that are chosen so that each pattern is a superset of the one before.
Figure 4B:
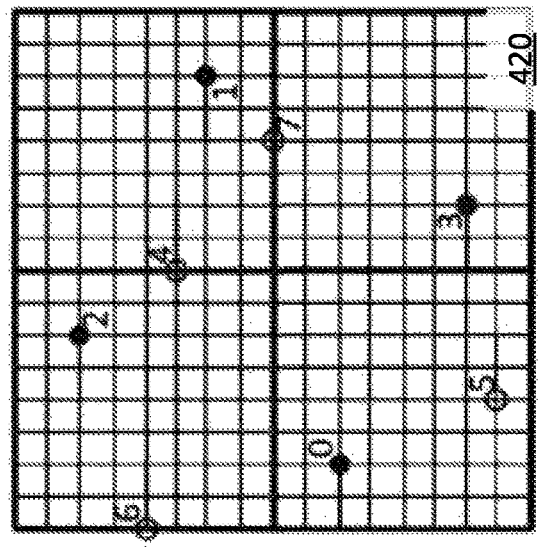
Figure 4A:
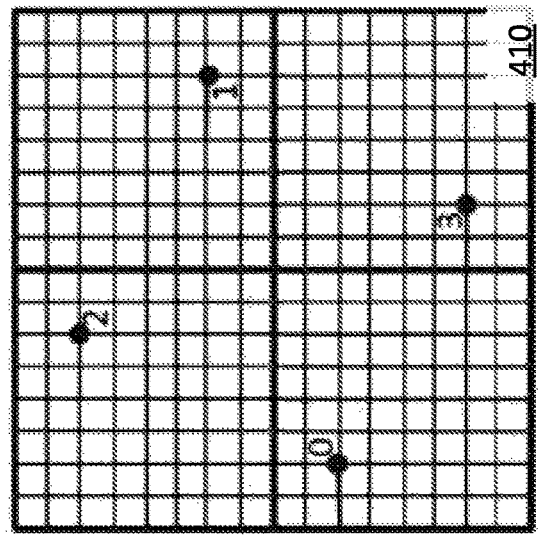

FIGS. 4A-4C show examples of a way to define 4×, 8×, and 16× sample patterns, respectively, that are chosen so that each pattern is a superset of the one before. FIG. 4A shows a 4 sample pattern 410, which is the pattern of the samples of a 4× multi-sample pixel. The samples are labeled based upon their priority from 0-3, with the lowest value representing the highest priority.

Since the invalidity designation is based upon priority, a minimum priority of sample threshold of at least four ensures that theses samples from the 4× multi-pixel pattern will not be marked as invalid. Generally, if there are three or fewer Z-planes covering these four top-priority samples, then Z-plane mode is used to represent the pixel. Otherwise, sample mode is used.

FIG. 4B shows an 8 sample pattern 420, which is the pattern of the samples of an 8× multi-sample pixel. FIG. 4C shows a 16 sample pattern 430, which is the pattern of the samples of a 16× multi-sample pixel. As depicted, there is a hexadecimal number beside the sample in each of the patterns (410, 420, 430). That hexadecimal number next to a sample specifies that sample's priority, with the smaller numbers having higher priority. These priority values are used to determine which Z-plane(s) to discard (e.g., mark as invalid) in Z-plane mode. The Z-planes with the lowest priority are discarded until only a defined number (e.g., three or seven) Z-planes remain—provided that those remaining Z-planes cover the samples having, at least, a minimum threshold in sample priority (e.g., top 4 in priority).

Examples of Compressing Triangles

FIGS. 5A-C show examples of how primitive (e.g., triangle) meshes may cover 2×2 pixel quads of 16× multi-sample pixels. In the discussion of these figures, it's presumed that the minimum priority threshold is four. That means that samples 0-3 have the highest priority and any Z-planes covering such a sample will be considered valid. In these figures, each pixel in the pixel quads includes four solid dots. The solid dots are indicative of the four normal (e.g., top-priority) samples. As depicted, the circles in the quads represent samples that are coverage samples (i.e., samples that can be set to invalid).

FIG. 5A has a single edge passing through the pixel quad 510. This example has no invalid samples because there are at most two Z-planes per pixel. Furthermore, each Z-plane covers a primary sample (as indicated by the solid dots). For this situation, an implementation may use the 2×2 format (e.g., format 330) or two of the 2-pixel formats (e.g., format 320) to encode the depth values.

FIG. 5B illustrates a problem case where the pixel quad 520 is covered by a silhouette edge over a large background triangle. There are four Z-planes in the 2×2 quad so Z-plane compression cannot be used because the 2×2 format 330 can only store three Z-planes. Instead, the lower two pixels should fall back to sample mode and store just four normal samples per pixel. The upper two pixels could be stored using Z-planes, since two triangles fully cover all of their samples. However, a slightly different tessellation would result in three triangles covering the upper two pixels, so that they also would need to fall back to sample mode and store just four normal samples per pixel.

FIG. 5C illustrates a more severe problem case where a pixel (in the upper left-hand corner) of the pixel quad 530 contains a vertex where six triangles meet. There are six Z-planes in the 2×2 quad so Z-plane compression cannot be used because the 2×2 format 330 can only store three Z-planes. Also, each pair of pixels require more than two Z-planes. As a result, all four pixels should fall back to storing just the four normal samples per pixel. The interior of a tessellated mesh is likely to not require as many samples a a silhouette edge to avoid visual artifacts, but it is preferable to use Z-planes when possible.

Solving problem cases 5B and 5C requires a new compression format that covers a larger block of pixels and can store more Z-planes. FIG. 6 shows an example of a format 610 that encodes for a 4×4 block of multi-sample pixels. Each pixel has a 4-bit mask per sample to select a Z-plane, the fast clear depth, or invalid. This format 610 permits storing two different Z-plane representations: the 112-bit representation (as discussed above) and an 85-bit representation, which can be packed so that three fit into 255-bits. The smaller 85-bit representation is assumed to be sufficient for small triangles that have relatively shallow slopes, so that the Z-plane representation doesn't require as many bits as triangles that could be the size of the entire viewport. Metadata bits select the combination of 112-bit and 85-bit Z-planes used in 610.

Figure 7:
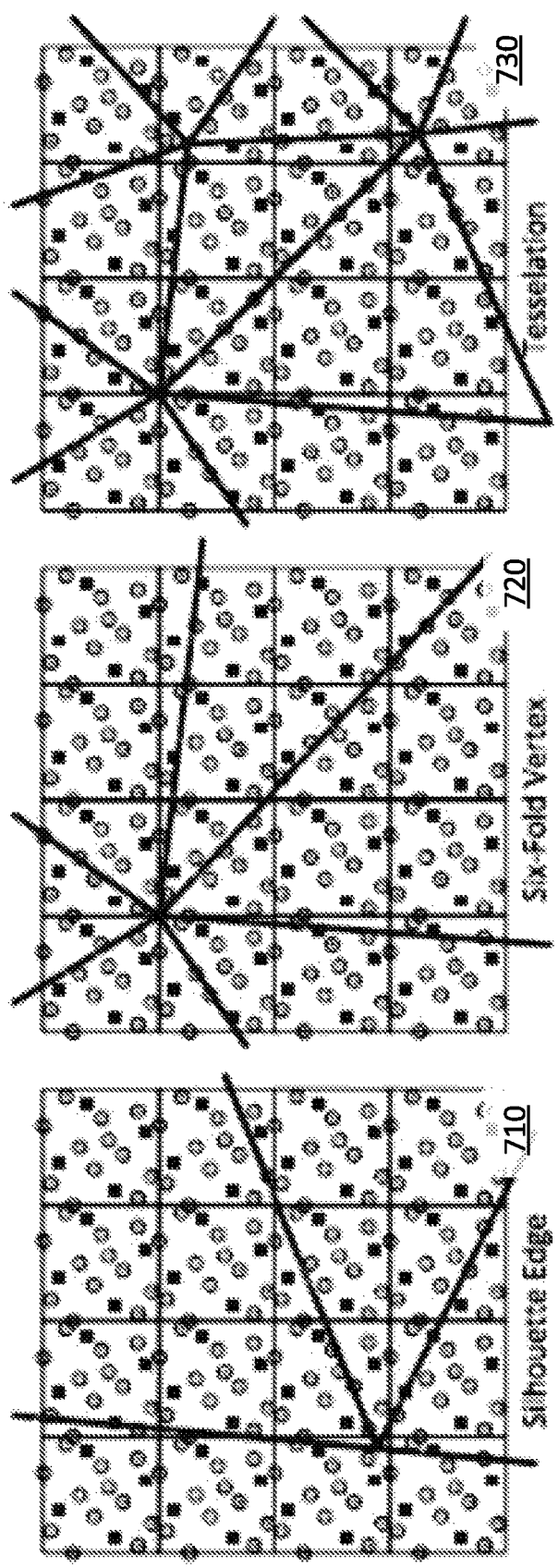
FIGS. 7A-C illustrate examples of how primitive (e.g., triangle) meshes may cover 4×4 pixel quads of 16× multi-sample pixels.

FIGS. 7A-C show examples of how primitive (e.g., triangle) meshes may cover 4×4 pixel quads of 16× multi-sample pixels. In the discussion of these figures, it's presumed that there are four normal samples per pixel. That means that samples 0-3 have the highest priority and will always have depth values associated with them. In these figures, each pixel in the pixel quads includes four solid dots. The solid dots are indicative of the four normal (e.g., top-priority) samples. As depicted, the circles in the quads represent coverage samples (i.e., having lower priority).

FIG. 7A has the pixel block 710 covered by a silhouette edge over a large background triangle. FIG. 7B has a pixel block 720 covered with a vertex where six triangle meet. Both of them can be stored with no invalid samples using 4×4 Z-plane format 610, since that format permits up to eight 112-bit Z-planes. In both cases the tessellation is relatively coarse so that a 4×4 block contains only one mesh vertex.

FIG. 7C has a pixel block 730 covered with a tessellation of small triangles and requires a total of 12 Z-planes. If the small triangles have shallow depth slopes that permit using 85-bit Z-planes, then this example can also use 4×4 format 610, since it permits up to 12 85-bit Z-planes. Format 610 also permits combinations such as two 122-bit Z-planes and six 85-bit Z-planes, for intermediate cases where fewer triangles overlap the 4×4 pixel block but some of them cannot be encoded with an 85-bit Z-plane.

Additional compression can be achieved by using a lossless compression algorithm together with the lossy compression techniques described herein. Other approaches can take advantage of the fact that many 2×2 or 4×4 pixel blocks use far fewer Z-planes than are allowed in the formats discussed thus far herein. For example, if two triangles fully cover a 4×4 pixel block, then one can store two Z-planes and 256-bits of 1-bit masks per sample. That is a quarter of the storage of the 4×4 formats (e.g., 610) described above. If a single Z-plane covers the entire 4×4 pixel block, then just a sixteenth of the memory space of the 4×4 formats (e.g., 610) described above is used.

Different numbers of bits per Z-plane may be utilized or different numbers of samples (in the top-priority). If the Z-plane mode cannot store depth values for all of the primary (i.e., top-priority), then individual depth values are specified at those positions (e.g., sample mode is used). This results in a guaranteed minimum quality level regardless of the complexity of the triangle meshes covering the pixels.

Example Methodological Implementation

Figure 8:
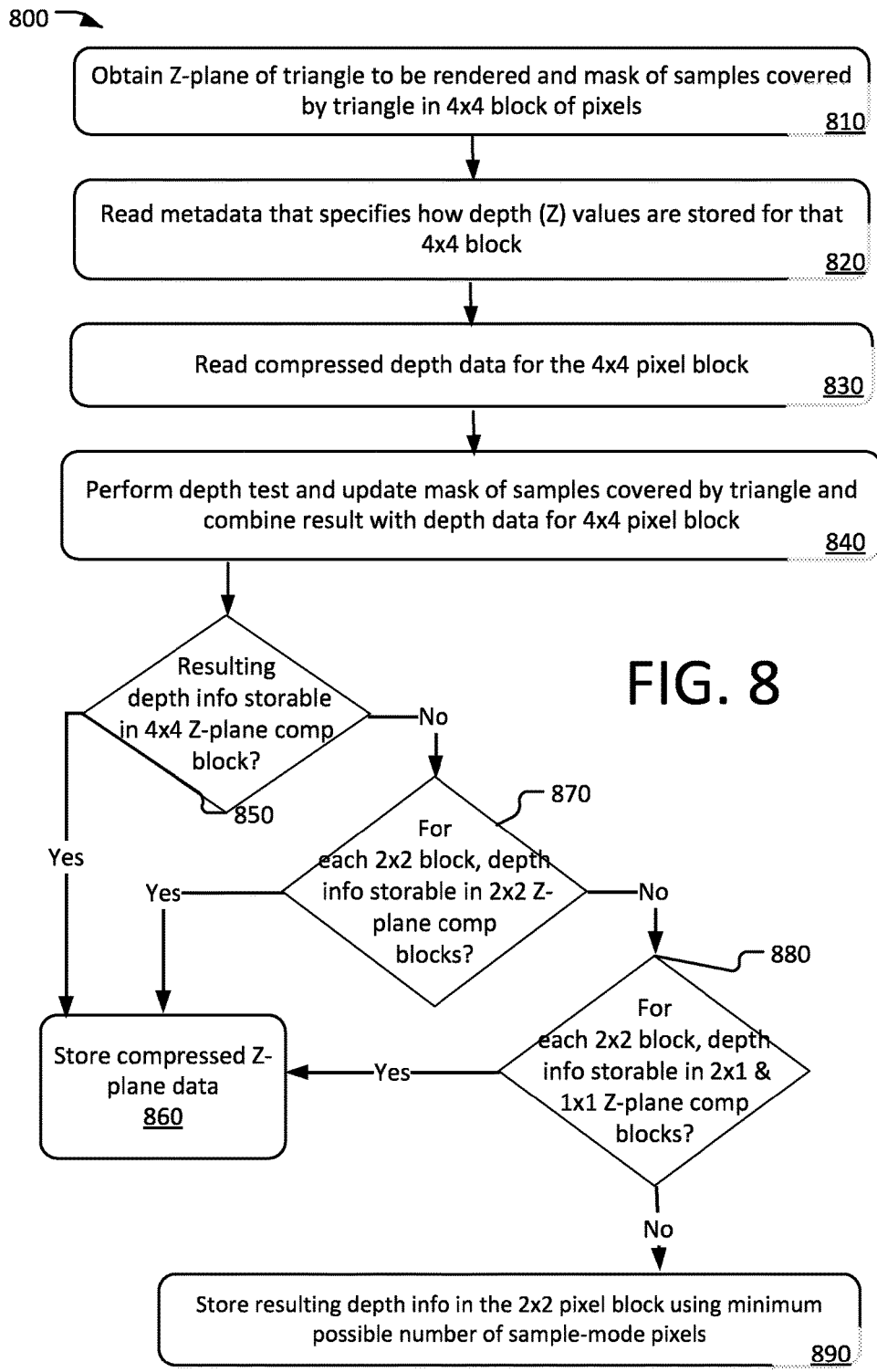
FIG. 8 illustrates an example process illustrating the techniques as described herein to facilitate depth compression of multi-sample pixels.

FIG. 8 shows an example process 800 illustrating the techniques as described herein to facilitate depth compression of multi-sample pixels. The example process 800 may be implemented as part of a computer graphics (CG) system.

At block 810, a computer graphics system obtains a triangle to rasterize into a 4×4 block of pixels. This includes the Z-plane defined by the triangle and a mask of the samples that are within the triangle and also within the 4×4 block of pixels. For discussion purposes, an example-pixel has 16 samples. This block 810 may be described as obtaining a rasterized multi-sample pixel or a group (e.g., block) of such pixels. This step occurs after hierarchical depth testing, if performed by the computer graphics system.

At block 820, the computer graphics system obtains metadata that specifies how compressed depth data is stored within the 4×4 pixel block. Then at block 830, the computer graphics system reads the depth data for the 4×4 pixel block. This may be stored as individual depth sample, as Z-planes with masks to show which Z-plane is used for each sample, or as a combination of both.

At block 840, the computer graphics system performs the depth test, which compares a depth value from the triangle at each sample with the depth value stored in memory for that sample. As a result, the mask of samples within the triangle is modified to include only the samples that pass the depth test and are to be written to memory. This mask is used to replace existing depth values in the 4×4 block (whether specified as sample depth values or as Z-planes) with the triangle's Z-plane and the mask of samples where the depth test passed.

Typically, a depth test involves the comparison of the triangle depth (i.e., source depth) and the stored depth (i.e., destination depth). For example, the "depth test" might be greater-than. Then if the triangle depth is greater than the stored depth, the test passes and the triangle depth is written out. If the triangle depth is less than or equal to the stored depth, the test fails and the depth is not written out.

Block 850 determines whether the resulting depth data can be stored using the 4×4 pixel block Z-plane compression formats 610. This requires that the depth data is all specified by Z-planes, and that the set of Z-planes that covers the normal samples fit within format 610. If all of the additional Z-planes that cover only coverage samples do not fit in format 610, the highest priority Z-planes are selected for storage. This is determined by finding the highest priority sample covered by each Z-plane and using that as the priority of the Z-plane.

If block 850 determines that the depth information can be stored in format 610, then block 860 stores the Z-plane information. Otherwise block 870 breaks the 4×4 pixel block into individual 2×2 pixel blocks and determines whether the depth information in each can be stored using the 2×2 Z-plane format 330. This requires that up to three Z-planes and the depth clear value cover all of the normal samples in the 2×2 pixel block. If so, then block 860 stores the Z-plane information.

If a 2×2 pixel block cannot be stored in Z-plane format 330, then block 880 determines whether the 2×2 block can be stored in a combination of the 2×1 and 1×1 Z-plane formats 320 and 310. If so, then block 860 stores the Z-plane data. Otherwise, block 890 stores the depth information using the minimum number of sample-mode pixels, that is, pixels where individual depth values are stored for the normal samples and the coverage samples are all implicitly invalid.

System Overview

Figure 9:
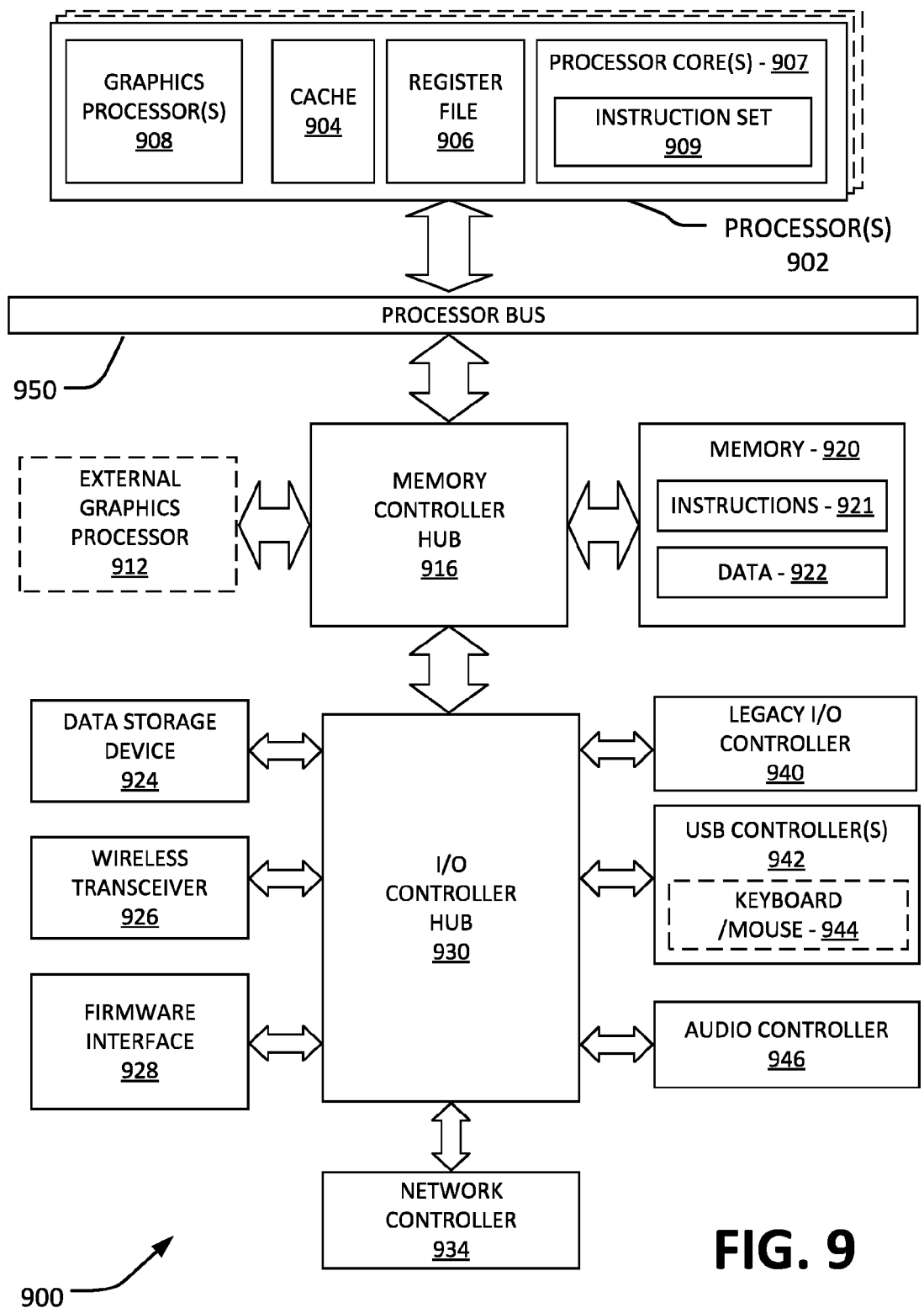
FIG. 9 is a block diagram of a data processing system according to an embodiment.

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In one embodiment, the system 900 is a processing platform incorporated within a system-on-a-chip (SoC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled with a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples with processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
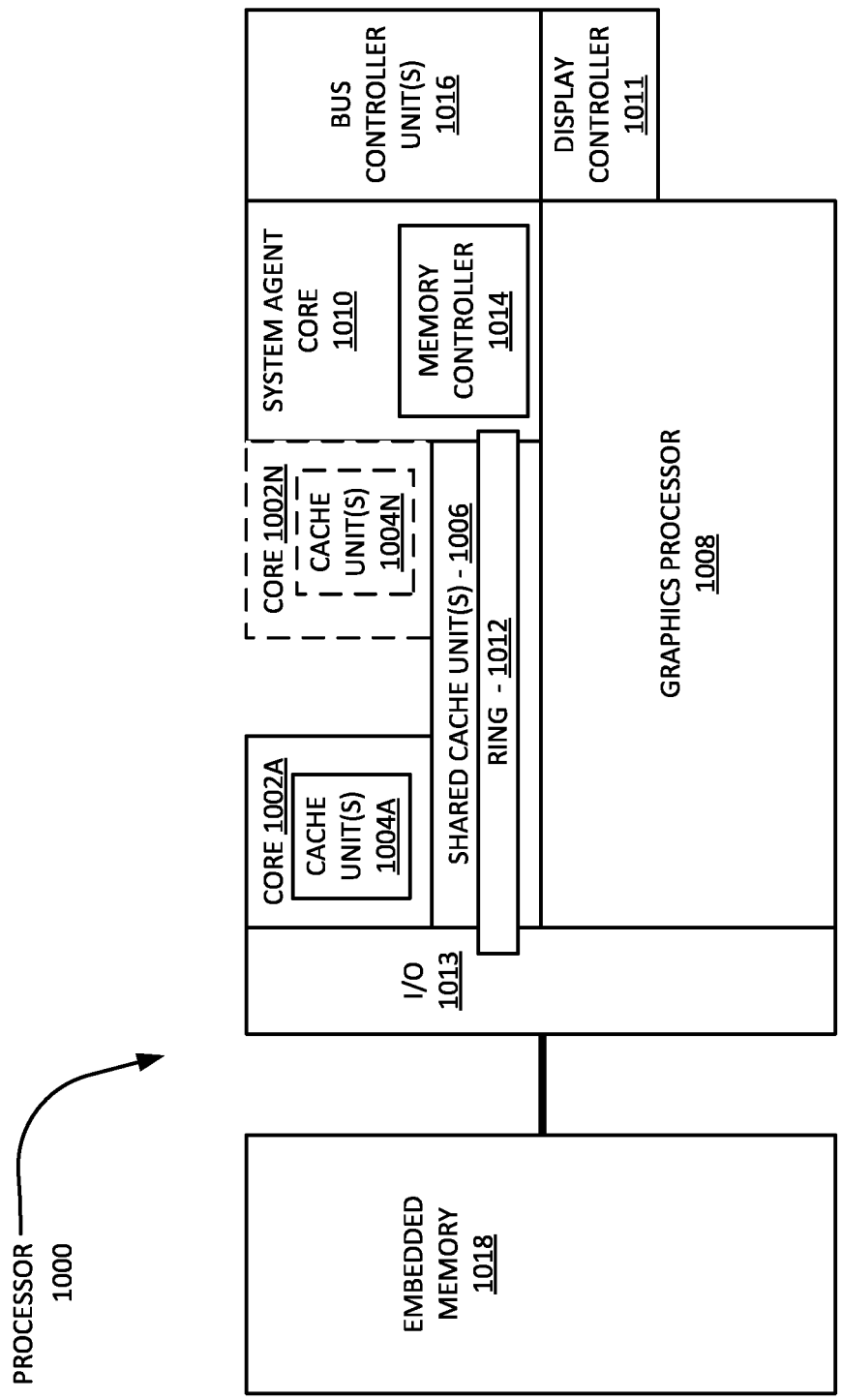
FIG. 10 is a block diagram of an embodiment of a processor having one or more processor cores, an integrated memory controller, and an integrated graphics processor.

FIG. 10 is a block diagram of an embodiment of a processor 1000 having one or more processor cores 1002A-1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A-1002N includes one or more internal cache units 1004A-1004N. In some embodiments each processor core also has access to one or more shared cached units 1006.

The internal cache units 1004A-1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A-1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A-1002N include support for simultaneous multi-threading. In such embodiment, the system agent core 1010 includes components for coordinating and operating cores 1002A-1002N during multi-threaded processing. System agent core 1010 may additionally include a power control unit (PCU), which includes logic and components to regulate the power state of processor cores 1002A-1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM module. In some embodiments, each of the processor cores 1002A-1002N and graphics processor 1008 use embedded memory modules 1018 as a shared Last Level Cache.

In some embodiments, processor cores 1002A-1002N are homogenous cores executing the same instruction set architecture. In another embodiment, processor cores 1002A-1002N are heterogeneous in terms of instruction set architecture (ISA), where one or more of processor cores 1002A-N execute a first instruction set, while at least one of the other cores executes a subset of the first instruction set or a different instruction set. In one embodiment processor cores 1002A-1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
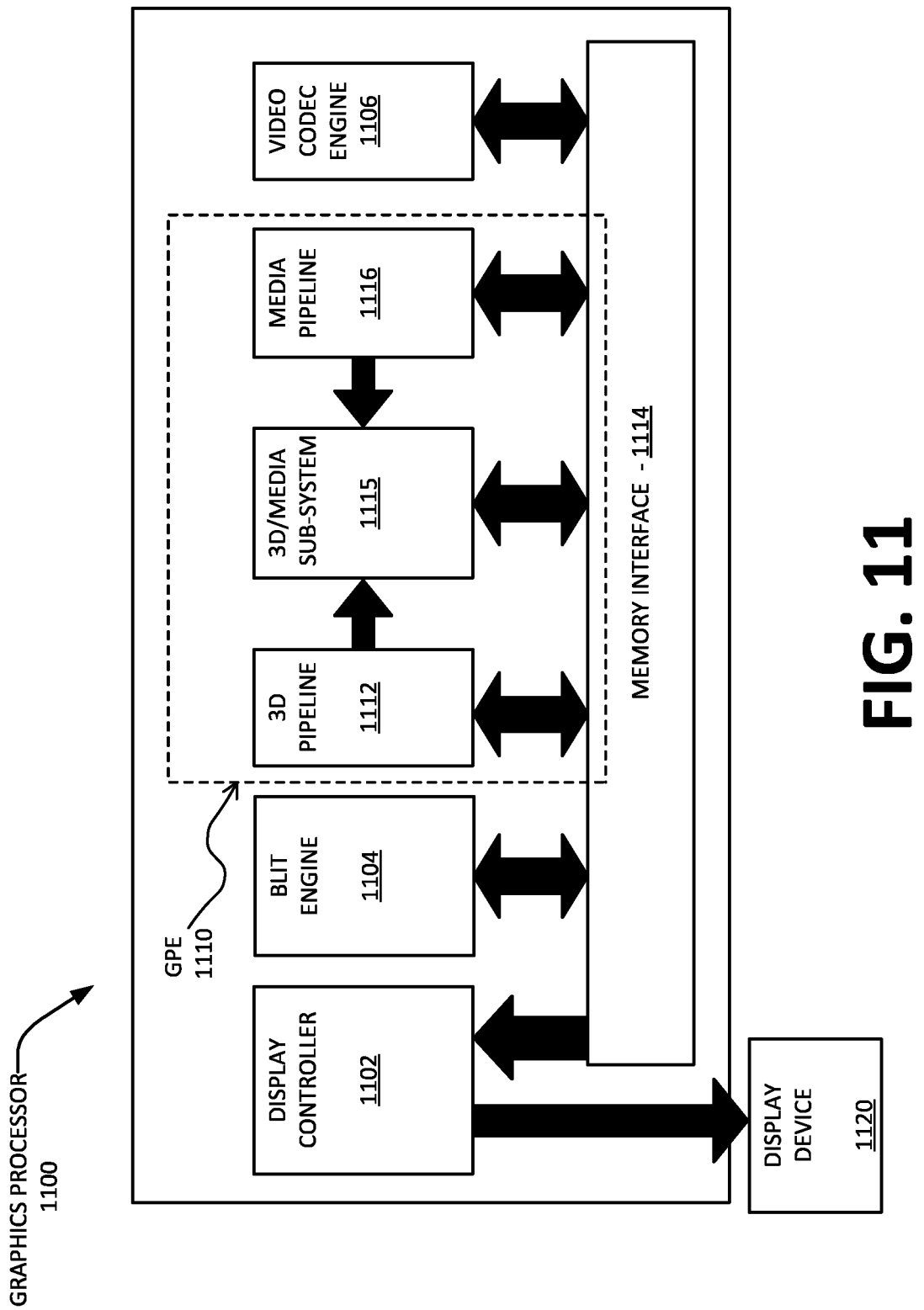
FIG. 11 is a block diagram of one embodiment of a graphics processor which may be a discrete graphics processing unit, or may be graphics processor integrated with a plurality of processing cores.

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 2D graphics operations are performed using one or more components of graphics processing engine (GPE) 1110. In some embodiments, GPE 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

Graphics Processing Engine

Figure 12:
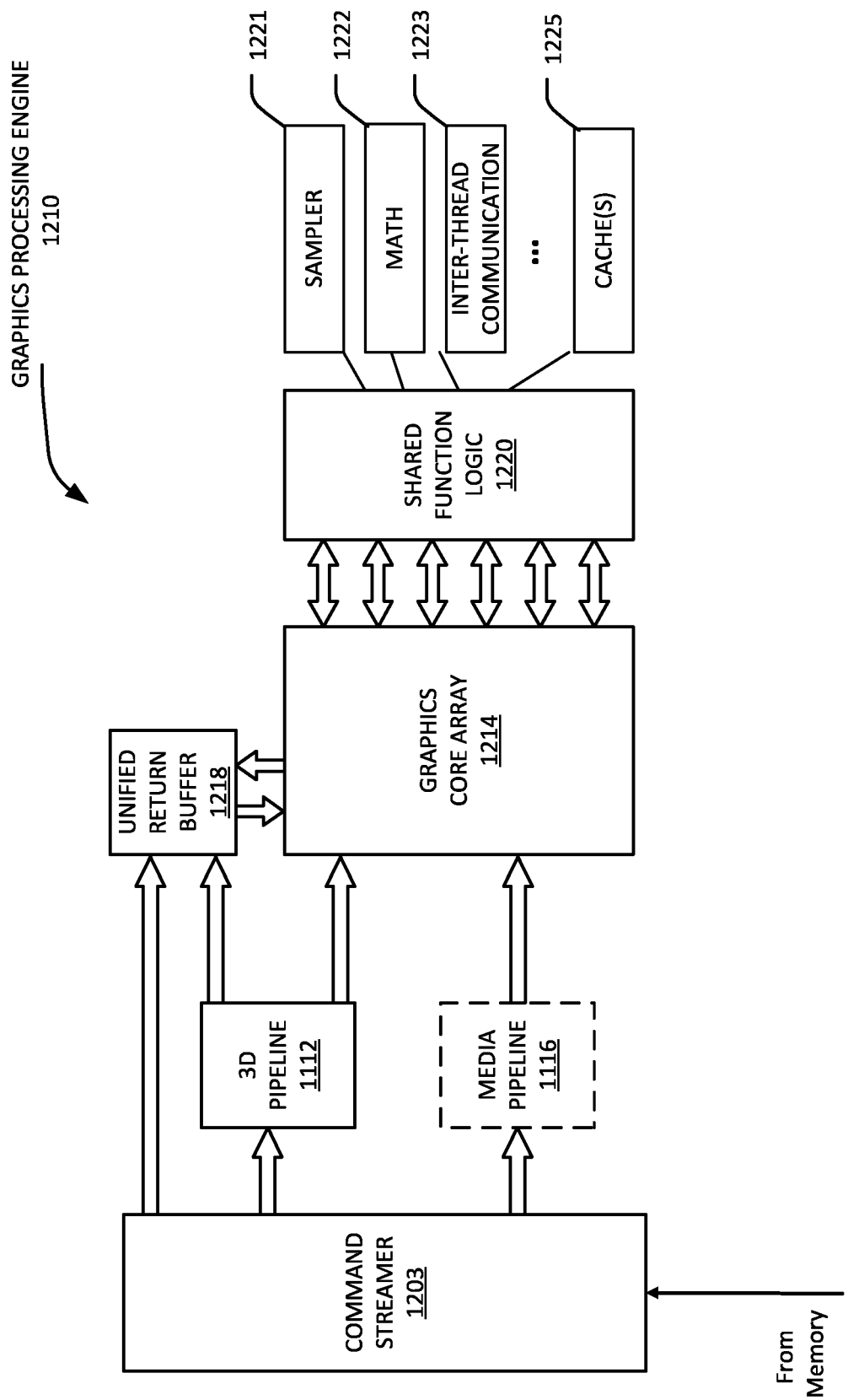
FIG. 12 is a block diagram of an embodiment of a graphics processing engine for a graphics processor.

FIG. 12 is a block diagram of a graphics processing engine 1210 of a graphics processor in accordance with some embodiments. In one embodiment, the graphics processing engine (GPE) 1210 is a version of the GPE 1110 shown in FIG. 11. Elements of FIG. 12 having the same reference numbers (or names) as the elements of any other figure herein can operate or function in any manner similar to that described elsewhere herein, but are not limited to such. For example, the 3D pipeline 1112 and media pipeline 1116 of FIG. 11 are illustrated. The media pipeline 1116 is optional in some embodiments of the GPE 1210 and may not be explicitly included within the GPE 1210. For example and in at least one embodiment, a separate media and/or image processor is coupled to the GPE 1210.

In some embodiments, GPE 1210 couples with or includes a command streamer 1203, which provides a command stream to the 3D pipeline 1112 and/or media pipelines 1116. In some embodiments, command streamer 1203 is coupled with memory, which can be system memory, or one or more of internal cache memory and shared cache memory. In some embodiments, command streamer 1203 receives commands from the memory and sends the commands to 3D pipeline 1112 and/or media pipeline 1116. The commands are directives fetched from a ring buffer, which stores commands for the 3D pipeline 1112 and media pipeline 1116. In one embodiment, the ring buffer can additionally include batch command buffers storing batches of multiple commands. The commands for the 3D pipeline 1112 can also include references to data stored in memory, such as but not limited to vertex and geometry data for the 3D pipeline 1112 and/or image data and memory objects for the media pipeline 1116. The 3D pipeline 1112 and media pipeline 1116 process the commands and data by performing operations via logic within the respective pipelines or by dispatching one or more execution threads to a graphics core array 1214.

In various embodiments the 3D pipeline 1112 can execute one or more shader programs, such as vertex shaders, geometry shaders, pixel shaders, fragment shaders, compute shaders, or other shader programs, by processing the instructions and dispatching execution threads to the graphics core array 1214. The graphics core array 1214 provides a unified block of execution resources. Multi-purpose execution logic (e.g., execution units) within the graphic core array 1214 includes support for various 3D API shader languages and can execute multiple simultaneous execution threads associated with multiple shaders.

In some embodiments the graphics core array 1214 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 907 of FIG. 9 or core 1002A-1002N as in FIG. 10.

Output data generated by threads executing on the graphics core array 1214 can output data to memory in a unified return buffer (URB) 1218. The URB 1218 can store data for multiple threads. In some embodiments the URB 1218 may be used to send data between different threads executing on the graphics core array 1214. In some embodiments the URB 1218 may additionally be used for synchronization between threads on the graphics core array and fixed function logic within the shared function logic 1220.

In some embodiments, graphics core array 1214 is scalable, such that the array includes a variable number of graphics cores, each having a variable number of execution units based on the target power and performance level of GPE 1210. In one embodiment the execution resources are dynamically scalable, such that execution resources may be enabled or disabled as needed.

The graphics core array 1214 couples with shared function logic 1220 that includes multiple resources that are shared between the graphics cores in the graphics core array. The shared functions within the shared function logic 1220 are hardware logic units that provide specialized supplemental functionality to the graphics core array 1214. In various embodiments, shared function logic 1220 includes but is not limited to sampler 1221, math 1222, and inter-thread communication (ITC) 1223 logic. Additionally, some embodiments implement one or more cache(s) 1225 within the shared function logic 1220. A shared function is implemented where the demand for a given specialized function is insufficient for inclusion within the graphics core array 1214. Instead a single instantiation of that specialized function is implemented as a stand-alone entity in the shared function logic 1220 and shared among the execution resources within the graphics core array 1214. The precise set of functions that are shared between the graphics core array 1214 and included within the graphics core array 1214 varies between embodiments.

Figure 13:
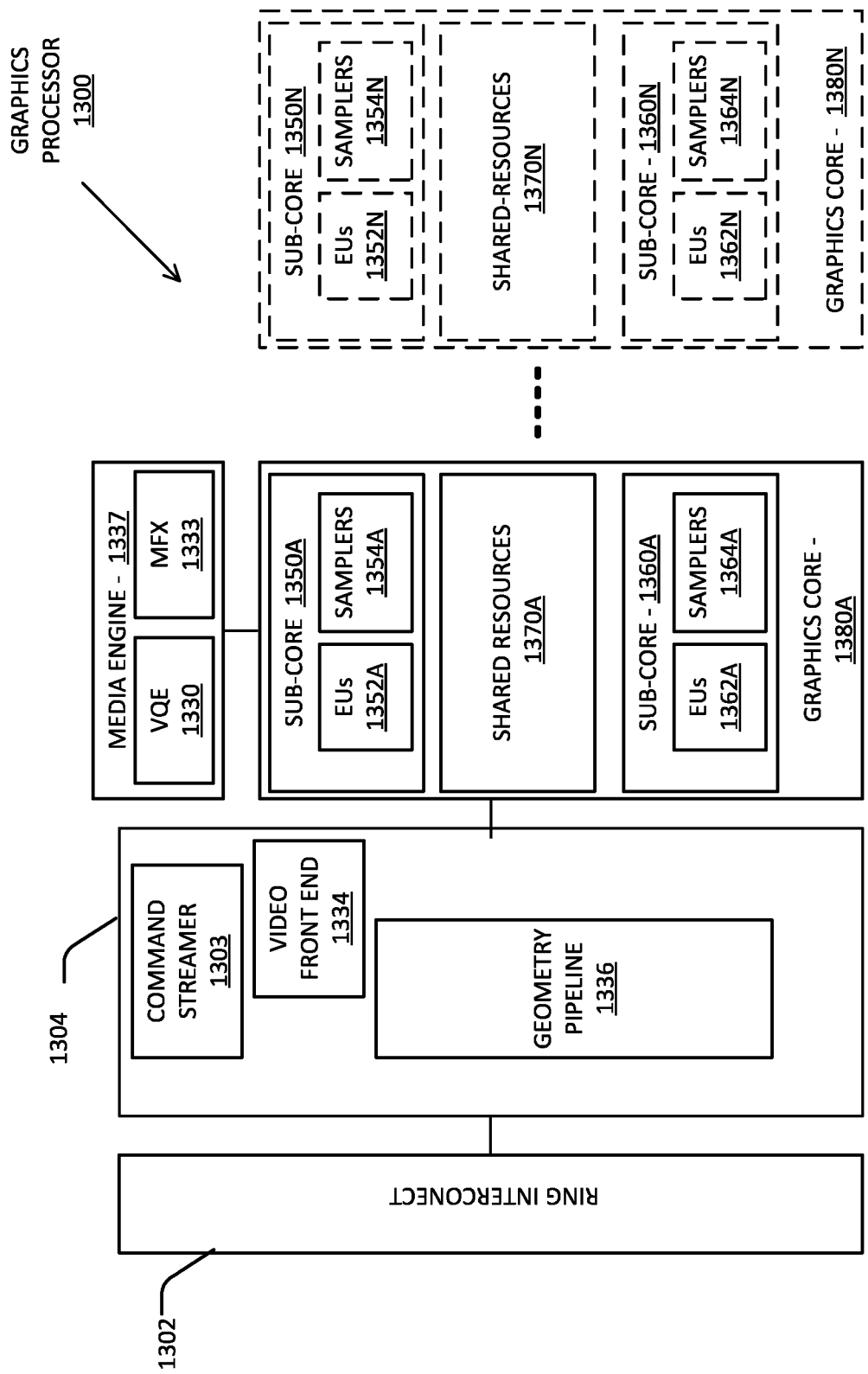
FIG. 13 is a block diagram of another embodiment of a graphics processor.

FIG. 13 is a block diagram of another embodiment of a graphics processor 1300. Elements of FIG. 13 having the same reference numbers (or names) as the elements of any other figure herein can operate or function in any manner similar to that described elsewhere herein, but are not limited to such.

In some embodiments, graphics processor 1300 includes a ring interconnect 1302, a pipeline front-end 1304, a media engine 1337, and graphics cores 1380A-1380N. In some embodiments, ring interconnect 1302 couples the graphics processor to other processing units, including other graphics processors or one or more general-purpose processor cores. In some embodiments, the graphics processor is one of many processors integrated within a multi-core processing system.

In some embodiments, graphics processor 1300 receives batches of commands via ring interconnect 1302. The incoming commands are interpreted by a command streamer 1303 in the pipeline front-end 1304. In some embodiments, graphics processor 1300 includes scalable execution logic to perform 3D geometry processing and media processing via the graphics core(s) 1380A-1380N. For 3D geometry processing commands, command streamer 1303 supplies commands to geometry pipeline 1336. For at least some media processing commands, command streamer 1303 supplies the commands to a video front end 1334, which couples with a media engine 1337. In some embodiments, media engine 1337 includes a Video Quality Engine (VQE) 1330 for video and image post-processing and a multi-format encode/decode (MFX) 1333 engine to provide hardware-accelerated media data encode and decode. In some embodiments, geometry pipeline 1336 and media engine 1337 each generate execution threads for the thread execution resources provided by at least one graphics core 1380A.

In some embodiments, graphics processor 1300 includes scalable thread execution resources featuring modular cores 1380A-1380N (sometimes referred to as core slices), each having multiple sub-cores 1350A-1350N, 1360A-1360N (sometimes referred to as core sub-slices). In some embodiments, graphics processor 1300 can have any number of graphics cores 1380A through 1380N. In some embodiments, graphics processor 1300 includes a graphics core 1380A having at least a first sub-core 1350A and a second sub-core 1360A. In other embodiments, the graphics processor is a low power processor with a single sub-core (e.g., 1350A). In some embodiments, graphics processor 1300 includes multiple graphics cores 1380A-1380N, each including a set of first sub-cores 1350A-1350N and a set of second sub-cores 1360A-1360N. Each sub-core in the set of first sub-cores 1350A-1350N includes at least a first set of execution units 1352A-1352N and media/texture samplers 1354A-1354N. Each sub-core in the set of second sub-cores 1360A-1360N includes at least a second set of execution units 1362A-1362N and samplers 1364A-1364N. In some embodiments, each sub-core 1350A-1350N, 1360A-1360N shares a set of shared resources 1370A-1370N. In some embodiments, the shared resources include shared cache memory and pixel operation logic. Other shared resources may also be included in the various embodiments of the graphics processor.

Execution Units

Figure 14:
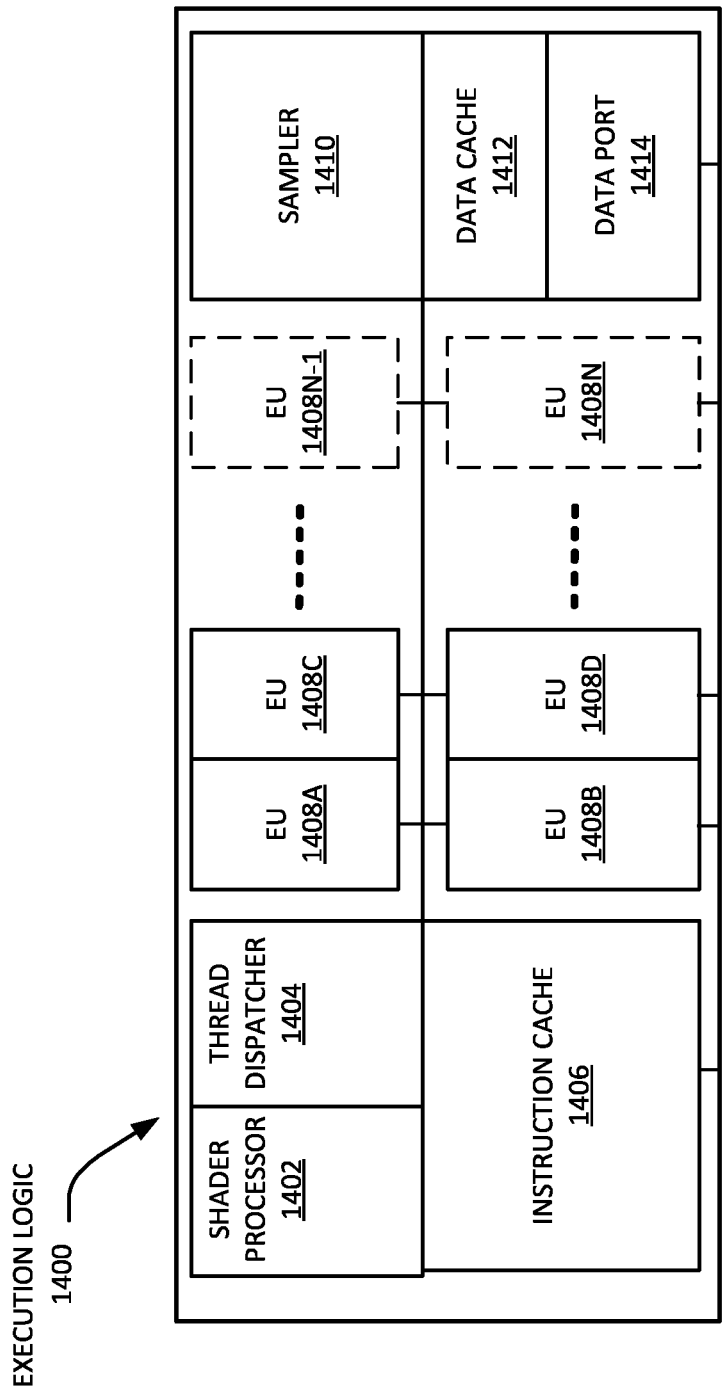
FIG. 14 illustrates thread execution logic including an array of processing elements employed in one embodiment of a graphics processing engine.

FIG. 14 illustrates thread execution logic 1400 including an array of processing elements employed in some embodiments of a GPE. Elements of FIG. 14 having the same reference numbers (or names) as the elements of any other figure herein can operate or function in any manner similar to that described elsewhere herein, but are not limited to such.

In some embodiments, thread execution logic 1400 includes a shader processor 1402, a thread dispatcher 1404, instruction cache 1406, a scalable execution unit array including a plurality of execution units 1408A-1408N, a sampler 1410, a data cache 1412, and a data port 1414. In one embodiment the scalable execution unit array can dynamically scale by enabling or disabling one or more execution units (e.g., any of execution unit 1408A, 1408B, 1408C, 1408D, through 1408N-1 and 1408N) based on the computational requirements of a workload. In one embodiment the included components are interconnected via an interconnect fabric that links to each of the components. In some embodiments, thread execution logic 1400 includes one or more connections to memory, such as system memory or cache memory, through one or more of instruction cache 1406, data port 1414, sampler 1410, and execution units 1408A-1408N. In some embodiments, each execution unit (e.g. 1408A) is a stand-alone programmable general purpose computational unit that is capable of executing multiple simultaneous hardware threads while processing multiple data elements in parallel for each thread. In various embodiments, the array of execution units 1408A-1408N is scalable to include any number individual execution units.

In some embodiments, the execution units 1408A-608N are primarily used to execute shader programs. A shader processor 1402 can process the various shader programs and dispatch execution threads associated with the shader programs via a thread dispatcher 1404. In one embodiment the thread dispatcher includes logic to arbitrate thread initiation requests from the graphics and media pipelines and instantiate the requested threads on one or more execution unit in the execution units 1408A-1408N. For example, the geometry pipeline (e.g., 1336 of FIG. 13) can dispatch vertex, tessellation, or geometry shaders to the thread execution logic 1400 (FIG. 14) for processing. In some embodiments, thread dispatcher 1404 can also process runtime thread spawning requests from the executing shader programs.

In some embodiments, the execution units 1408A-1408N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1408A-1408N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1408A-1408N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 1408A-1408N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1408A-1408N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1406) are included in the thread execution logic 1400 to cache thread instructions for the execution units. In some embodiments, one or more data caches (e.g., 1412) are included to cache thread data during thread execution. In some embodiments, a sampler 1410 is included to provide texture sampling for 3D operations and media sampling for media operations. In some embodiments, sampler 1410 includes specialized texture or media sampling functionality to process texture or media data during the sampling process before providing the sampled data to an execution unit.

During execution, the graphics and media pipelines send thread initiation requests to thread execution logic 1400 via thread spawning and dispatch logic. Once a group of geometric objects has been processed and rasterized into pixel data, pixel processor logic (e.g., pixel shader logic, fragment shader logic, etc.) within the shader processor 1402 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1402 then executes an application programming interface (API)-supplied pixel or fragment shader program. To execute the shader program, the shader processor 1402 dispatches threads to an execution unit (e.g., 1408A) via thread dispatcher 1404. In some embodiments, pixel shader 1402 uses texture sampling logic in the sampler 1410 to access texture data in texture maps stored in memory. Arithmetic operations on the texture data and the input geometry data compute pixel color data for each geometric fragment, or discards one or more pixels from further processing.

In some embodiments, the data port 1414 provides a memory access mechanism for the thread execution logic 1400 output processed data to memory for processing on a graphics processor output pipeline. In some embodiments, the data port 1414 includes or couples with one or more cache memories (e.g., data cache 1412) to cache data for memory access via the data port.

FIG. 15 is a block diagram illustrating a graphics processor instruction formats 1500 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1500 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1510. A 64-bit compacted instruction format 1530 is available for some instructions based on the selected instruction, instruction options, and number of operands. The native 128-bit instruction format 1510 provides access to all instruction options, while some options and operations are restricted in the 64-bit format 1530. The native instructions available in the 64-bit format 1530 vary by embodiment. In some embodiments, the instruction is compacted in part using a set of index values in an index field 1513. The execution unit hardware references a set of compaction tables based on the index values and uses the compaction table outputs to reconstruct a native instruction in the 128-bit instruction format 1510.

For each format, instruction opcode 1512 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1514 enables control over certain execution options, such as channels selection (e.g., predication) and data channel order (e.g., swizzle). For instructions in the 128-bit instruction format 1510 an exec-size field 1516 limits the number of data channels that will be executed in parallel. In some embodiments, exec-size field 1516 is not available for use in the 64-bit compact instruction format 1530.

Some execution unit instructions have up to three operands including two source operands, src0 1520, src1 1522, and one destination 1518. In some embodiments, the execution units support dual destination instructions, where one of the destinations is implied. Data manipulation instructions can have a third source operand (e.g., SRC2 1524), where the instruction opcode 1512 determines the number of source operands. An instruction's last source operand can be an immediate (e.g., hard-coded) value passed with the instruction.

In some embodiments, the 128-bit instruction format 1510 includes an access/address mode field 1526 specifying, for example, whether direct register addressing mode or indirect register addressing mode is used. When direct register addressing mode is used, the register address of one or more operands is directly provided by bits in the instruction.

In some embodiments, the 128-bit instruction format 1510 includes an access/address mode field 1526, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1526 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1512 bit-fields to simplify Opcode decode 1540. For an 8-bit opcode, bits 4, 5, and 6 allow the execution unit to determine the type of opcode. The precise opcode grouping shown is merely an example. In some embodiments, a move and logic opcode group 1542 includes data movement and logic instructions (e.g., move (mov), compare (cmp)). In some embodiments, move and logic group 1542 shares the five most significant bits (MSB), where move (mov) instructions are in the form of 0000xxxxb and logic instructions are in the form of 0001xxxxb. A flow control instruction group 1544 (e.g., call, jump (jmp)) includes instructions in the form of 0010xxxxb (e.g., 0x20). A miscellaneous instruction group 1546 includes a mix of instructions, including synchronization instructions (e.g., wait, send) in the form of 0011xxxxb (e.g., 0x30). A parallel math instruction group 1548 includes component-wise arithmetic instructions (e.g., add, multiply (mul)) in the form of 0100xxxxb (e.g., 0x40). The parallel math group 1548 performs the arithmetic operations in parallel across data channels. The vector math group 1550 includes arithmetic instructions (e.g., dp4) in the form of 0101xxxxb (e.g., 0x50). The vector math group performs arithmetic such as dot product calculations on vector operands.

Graphics Pipeline

Figure 16:
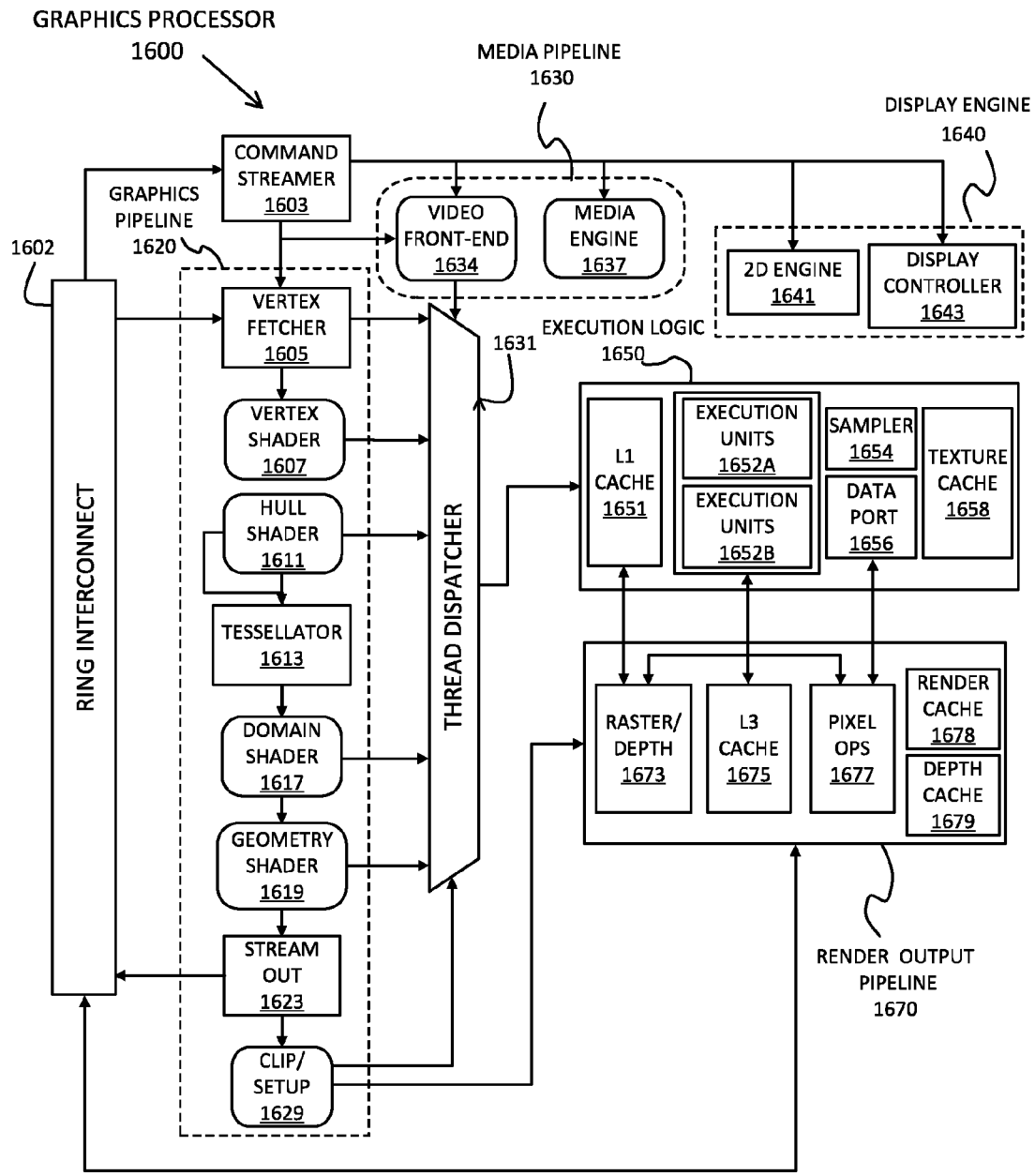
FIG. 16 is a block diagram of another embodiment of a graphics processor which includes a graphics pipeline, a media pipeline, a display engine, thread execution logic, and a render output pipeline.

FIG. 16 is a block diagram of another embodiment of a graphics processor 1600. Elements of FIG. 16 having the same reference numbers (or names) as the elements of any other figure herein can operate or function in any manner similar to that described elsewhere herein, but are not limited to such.

In some embodiments, graphics processor 1600 includes a graphics pipeline 1620, a media pipeline 1630, a display engine 1640, thread execution logic 1650, and a render output pipeline 1670. In some embodiments, graphics processor 1600 is a graphics processor within a multi-core processing system that includes one or more general purpose processing cores. The graphics processor is controlled by register writes to one or more control registers (not shown) or via commands issued to graphics processor 1600 via a ring interconnect 1602. In some embodiments, ring interconnect 1602 couples graphics processor 1600 to other processing components, such as other graphics processors or general-purpose processors. Commands from ring interconnect 1602 are interpreted by a command streamer 1603, which supplies instructions to individual components of graphics pipeline 1620 or media pipeline 1630.

In some embodiments, command streamer 1603 directs the operation of a vertex fetcher 1605 that reads vertex data from memory and executes vertex-processing commands provided by command streamer 1603. In some embodiments, vertex fetcher 1605 provides vertex data to a vertex shader 1607, which performs coordinate space transformation and lighting operations to each vertex. In some embodiments, vertex fetcher 1605 and vertex shader 1607 execute vertex-processing instructions by dispatching execution threads to execution units 1652A-1652B via a thread dispatcher 1631.

In some embodiments, execution units 1652A-1652B are an array of vector processors having an instruction set for performing graphics and media operations. In some embodiments, execution units 1652A, 1652B have an attached L1 cache 1651 that is specific for each array or shared between the arrays. The cache can be configured as a data cache, an instruction cache, or a single cache that is partitioned to contain data and instructions in different partitions.

In some embodiments, graphics pipeline 1620 includes tessellation components to perform hardware-accelerated tessellation of 3D objects. In some embodiments, a programmable hull shader 1611 configures the tessellation operations. A programmable domain shader 1617 provides back-end evaluation of tessellation output. A tessellator 1613 operates at the direction of hull shader 1611 and contains special purpose logic to generate a set of detailed geometric objects based on a coarse geometric model that is provided as input to graphics pipeline 1620. In some embodiments, if tessellation is not used, tessellation components (e.g., hull shader 1611, tessellator 1613, and domain shader 1617) can be bypassed.

In some embodiments, complete geometric objects can be processed by a geometry shader 1619 via one or more threads dispatched to execution units 1652A, 1652B, or can proceed directly to the clipper 1629. In some embodiments, the geometry shader operates on entire geometric objects, rather than vertices or patches of vertices as in previous stages of the graphics pipeline. If the tessellation is disabled the geometry shader 1619 receives input from the vertex shader 1607. In some embodiments, geometry shader 1619 is programmable by a geometry shader program to perform geometry tessellation if the tessellation units are disabled.

Before rasterization, a clipper 1629 processes vertex data. The clipper 1629 may be a fixed function clipper or a programmable clipper having clipping and geometry shader functions. In some embodiments, a rasterizer and depth test component 1673 in the render output pipeline 1670 dispatches pixel shaders to convert the geometric objects into their per pixel representations. In some embodiments, pixel shader logic is included in thread execution logic 1650. In some embodiments, an application can bypass the rasterizer and depth test component 1673 and access un-rasterized vertex data via a stream out unit 1623.

The graphics processor 1600 has an interconnect bus, interconnect fabric, or some other interconnect mechanism that allows data and message passing amongst the major components of the processor. In some embodiments, execution units 1652A, 1652B and associated cache(s) 1651, texture and media sampler 1654, and texture/sampler cache 1658 interconnect via a data port 1656 to perform memory access and communicate with render output pipeline components of the processor. In some embodiments, sampler 1654, caches 1651, 1658 and execution units 1652A, 1652B each have separate memory access paths.

In some embodiments, render output pipeline 1670 contains a rasterizer and depth test component 1673 that converts vertex-based objects into an associated pixel-based representation. In some embodiments, the rasterizer logic includes a windower/masker unit to perform fixed function triangle and line rasterization. An associated render cache 1678 and depth cache 1679 are also available in some embodiments. A pixel operations component 1677 performs pixel-based operations on the data, though in some instances, pixel operations associated with 2D operations (e.g. bit block image transfers with blending) are performed by the 2D engine 1641, or substituted at display time by the display controller 1643 using overlay display planes. In some embodiments, a shared L3 cache 1675 is available to all graphics components, allowing the sharing of data without the use of main system memory.

In some embodiments, graphics processor media pipeline 1630 includes a media engine 1637 and a video front end 1634. In some embodiments, video front end 1634 receives pipeline commands from the command streamer 1603. In some embodiments, media pipeline 1630 includes a separate command streamer. In some embodiments, video front-end 1634 processes media commands before sending the command to the media engine 1637. In some embodiments, media engine 1637 includes thread spawning functionality to spawn threads for dispatch to thread execution logic 1650 via thread dispatcher 1631.

In some embodiments, graphics processor 1600 includes a display engine 1640. In some embodiments, display engine 1640 is external to processor 1600 and couples with the graphics processor via the ring interconnect 1602, or some other interconnect bus or fabric. In some embodiments, display engine 1640 includes a 2D engine 1641 and a display controller 1643. In some embodiments, display engine 1640 contains special purpose logic capable of operating independently of the 3D pipeline. In some embodiments, display controller 1643 couples with a display device (not shown), which may be a system integrated display device, as in a laptop computer, or an external display device attached via a display device connector.

In some embodiments, graphics pipeline 1620 and media pipeline 1630 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 17A is a block diagram illustrating a graphics processor command format 1700 according to some embodiments. FIG. 17B is a block diagram illustrating a graphics processor command sequence 1710 according to an embodiment. The solid lined boxes in FIG. 17A illustrate the components that are generally included in a graphics command while the dashed lines include components that are optional or that are only included in a sub-set of the graphics commands. The exemplary graphics processor command format 1700 of FIG. 17A includes data fields to identify a target client 1702 of the command, a command operation code (opcode) 1704, and the relevant data 1706 for the command. A sub-opcode 1705 and a command size 1708 are also included in some commands.

In some embodiments, client 1702 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1704 and, if present, sub-opcode 1705 to determine the operation to perform. The client unit performs the command using information in data field 1706. For some commands an explicit command size 1708 is expected to specify the size of the command. In some embodiments, the command parser automatically determines the size of at least some of the commands based on the command opcode. In some embodiments commands are aligned via multiples of a double word.

The flow diagram in FIG. 17B shows an exemplary graphics processor command sequence 1710. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1710 may begin with a pipeline flush command 1712 to cause any active graphics pipeline to complete the currently pending commands for the pipeline. In some embodiments, the 3D pipeline 1722 and the media pipeline 1724 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1712 can be used for pipeline synchronization or before placing the graphics processor into a low power state.

In some embodiments, a pipeline select command 1713 is used when a command sequence requires the graphics processor to explicitly switch between pipelines. In some embodiments, a pipeline select command 1713 is required only once within an execution context before issuing pipeline commands unless the context is to issue commands for both pipelines. In some embodiments, a pipeline flush command is 1712 is required immediately before a pipeline switch via the pipeline select command 1713.

In some embodiments, a pipeline control command 1714 configures a graphics pipeline for operation and is used to program the 3D pipeline 1722 and the media pipeline 1724. In some embodiments, pipeline control command 1714 configures the pipeline state for the active pipeline. In one embodiment, the pipeline control command 1714 is used for pipeline synchronization and to clear data from one or more cache memories within the active pipeline before processing a batch of commands.

In some embodiments, return buffer state commands 1716 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1716 includes selecting the size and number of return buffers to use for a set of pipeline operations.

The remaining commands in the command sequence differ based on the active pipeline for operations. Based on a pipeline determination 1720, the command sequence is tailored to the 3D pipeline 1722 beginning with the 3D pipeline state 1730 or the media pipeline 1724 beginning at the media pipeline state 1740.

The commands to configure the 3D pipeline state 1730 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 1730 commands are also able to selectively disable or bypass certain pipeline elements if those elements will not be used.

In some embodiments, 3D primitive 1732 command is used to submit 3D primitives to be processed by the 3D pipeline. Commands and associated parameters that are passed to the graphics processor via the 3D primitive 1732 command are forwarded to the vertex fetch function in the graphics pipeline. The vertex fetch function uses the 3D primitive 1732 command data to generate vertex data structures. The vertex data structures are stored in one or more return buffers. In some embodiments, 3D primitive 1732 command is used to perform vertex operations on 3D primitives via vertex shaders. To process vertex shaders, 3D pipeline 1722 dispatches shader execution threads to graphics processor execution units.

In some embodiments, 3D pipeline 1722 is triggered via an execute 1734 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1710 follows the media pipeline 1724 path when performing media operations. In general, the specific use and manner of programming for the media pipeline 1724 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1724 is configured in a similar manner as the 3D pipeline 1722. A set of commands to configure the media pipeline state 1740 are dispatched or placed into a command queue before the media object commands 1742. In some embodiments, media pipeline state commands 1740 include data to configure the media pipeline elements that will be used to process the media objects. This includes data to configure the video decode and video encode logic within the media pipeline, such as encode or decode format. In some embodiments, media pipeline state commands 1740 also support the use of one or more pointers to "indirect" state elements that contain a batch of state settings.

In some embodiments, media object commands 1742 supply pointers to media objects for processing by the media pipeline. The media objects include memory buffers containing video data to be processed. In some embodiments, all media pipeline states should be valid before issuing a media object command 1742. Once the pipeline state is configured and media object commands 1742 are queued, the media pipeline 1724 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 18:
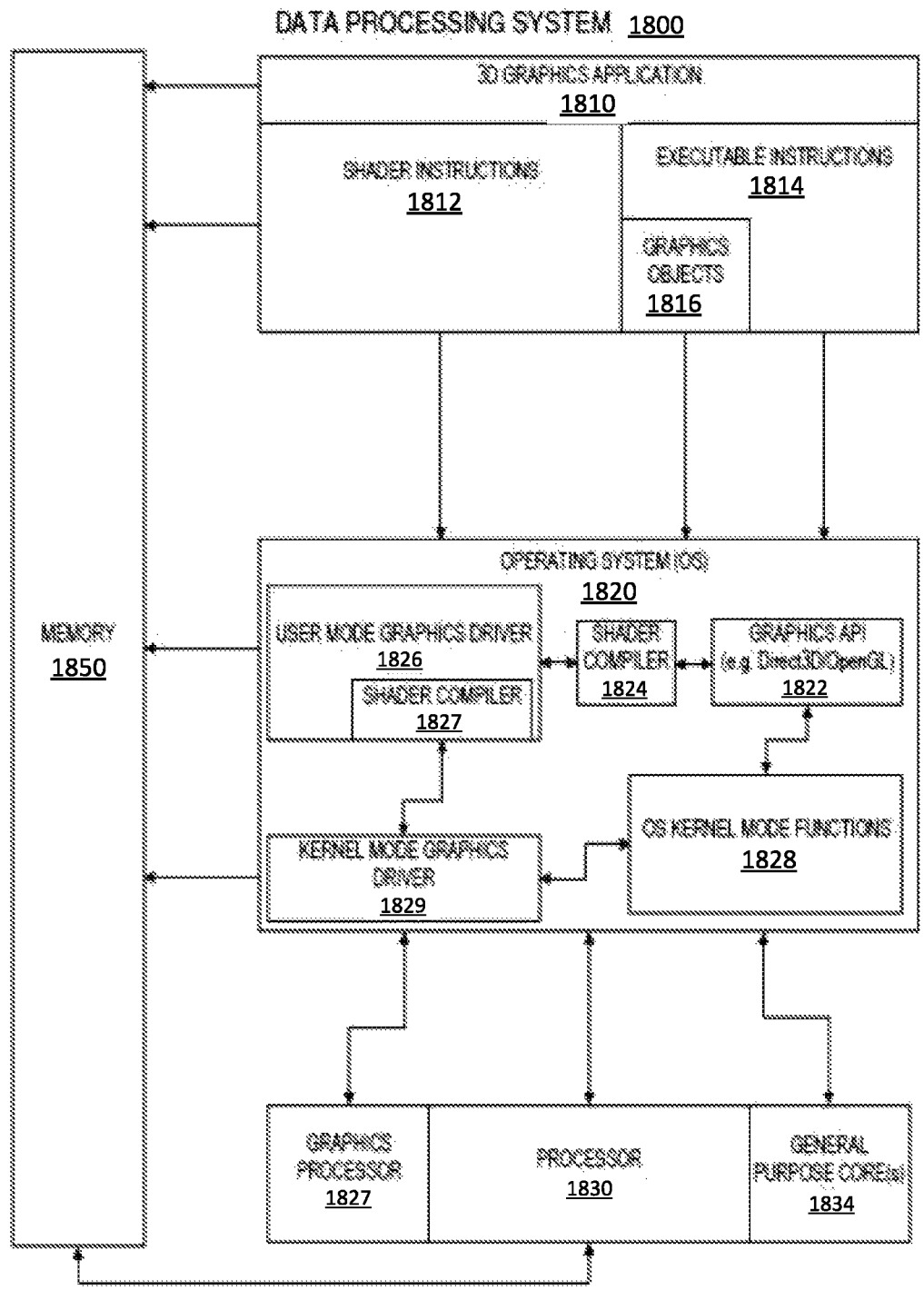
FIG. 18 illustrates exemplary graphics software architecture for a data processing system according to an embodiment.

FIG. 18 illustrates exemplary graphics software architecture for a data processing system 1800 according to some embodiments. In some embodiments, software architecture includes a 3D graphics application 1810, an operating system 1820, and at least one processor 1830. In some embodiments, processor 1830 includes a graphics processor 1832 and one or more general-purpose processor core(s) 1834. The graphics application 1810 and operating system 1820 each execute in the system memory 1850 of the data processing system.

In some embodiments, 3D graphics application 1810 contains one or more shader programs including shader instructions 1812. The shader language instructions may be in a high-level shader language, such as the High Level Shader Language (HLSL) or the OpenGL Shader Language (GLSL). The application also includes executable instructions 1814 in a machine language suitable for execution by the general-purpose processor core 1834. The application also includes graphics objects 1816 defined by vertex data.

In some embodiments, operating system 1820 is a Microsoft® Windows® operating system from the Microsoft Corporation, a proprietary UNIX-like operating system, or an open source UNIX-like operating system using a variant of the Linux kernel. The operating system 1820 can support a graphics API 1022 such as the Direct3D API, the OpenGL API, or the Vulkan API. When the Direct3D API is in use, the operating system 1820 uses a front-end shader compiler 1824 to compile any shader instructions 1812 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1810. In some embodiments, the shader instructions 1812 are provided in an intermediate form, such as a version of the Standard Portable Intermediate Representation (SPIR) used by the Vulkan API.

In some embodiments, user mode graphics driver 1826 contains a back-end shader compiler 1827 to convert the shader instructions 1812 into a hardware specific representation. When the OpenGL API is in use, shader instructions 1812 in the GLSL high-level language are passed to a user mode graphics driver 1826 for compilation. In some embodiments, user mode graphics driver 1826 uses operating system kernel mode functions 1828 to communicate with a kernel mode graphics driver 1829. In some embodiments, kernel mode graphics driver 1829 communicates with graphics processor 1832 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 19:
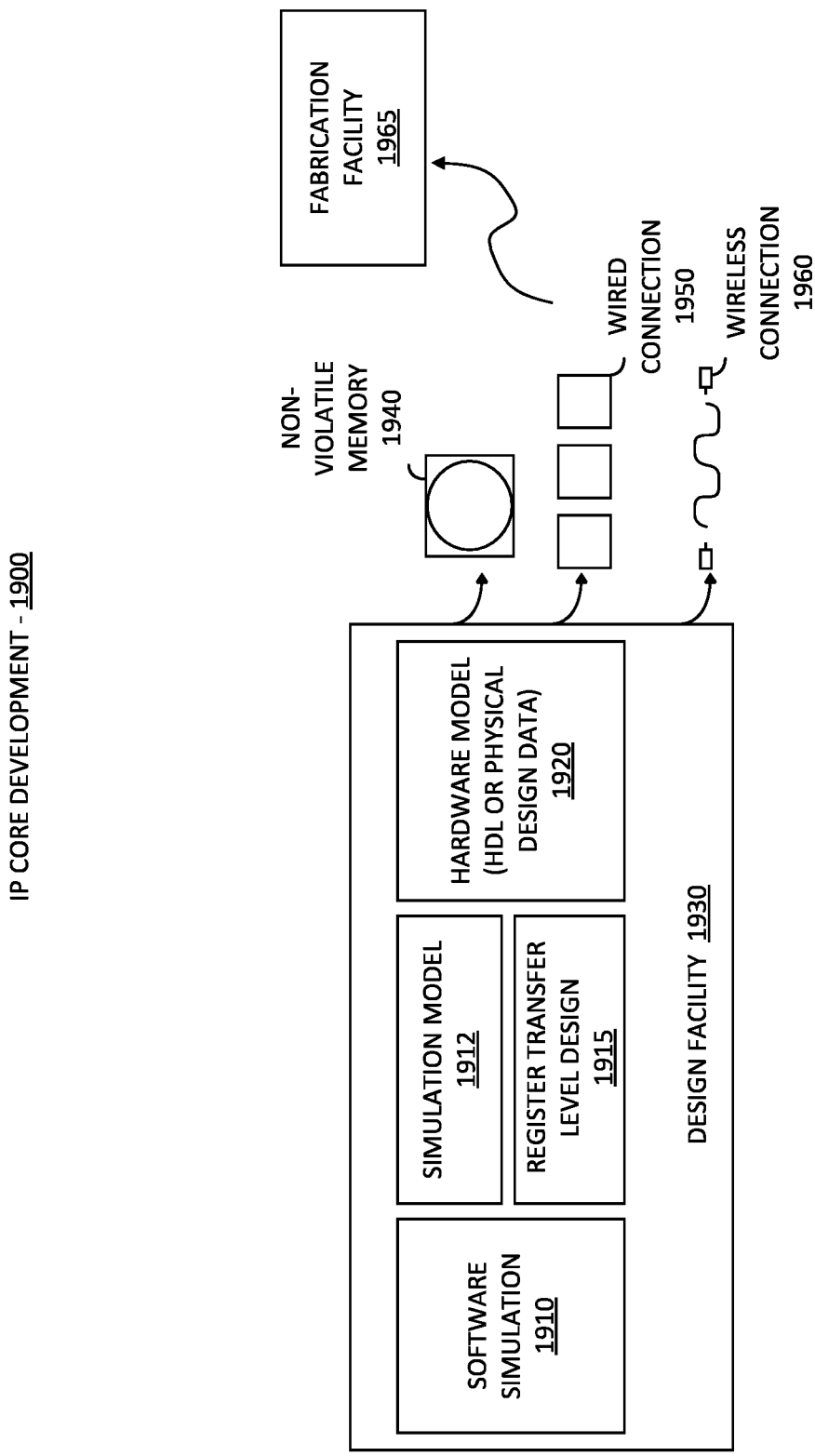
FIG. 19 is a block diagram illustrating an IP core development system that may be used to manufacture an integrated circuit to perform operations according to an embodiment.

FIG. 19 is a block diagram illustrating an IP core development 1900 that may be used to manufacture an integrated circuit to perform operations according to an embodiment. The IP core development system 1900 may be used to generate modular, re-usable designs that can be incorporated into a larger design or used to construct an entire integrated circuit (e.g., an SOC integrated circuit). A design facility 1930 can generate a software simulation 1910 of an IP core design in a high level programming language (e.g., C/C++). The software simulation 1910 can be used to design, test, and verify the behavior of the IP core using a simulation model 1912. The simulation model 1912 may include functional, behavioral, and/or timing simulations. A register transfer level (RTL) design can then be created or synthesized from the simulation model 1900. The RTL design 1915 is an abstraction of the behavior of the integrated circuit that models the flow of digital signals between hardware registers, including the associated logic performed using the modeled digital signals. In addition to an RTL design 1915, lower-level designs at the logic level or transistor level may also be created, designed, or synthesized. Thus, the particular details of the initial design and simulation may vary.

The RTL design 1915 or equivalent may be further synthesized by the design facility into a hardware model 1920, which may be in a hardware description language (HDL), or some other representation of physical design data. The HDL may be further simulated or tested to verify the IP core design. The IP core design can be stored for delivery to a $3^{rd}$ party fabrication facility 1965 using non-volatile memory 1940 (e.g., hard disk, flash memory, or any non-volatile storage medium). Alternatively, the IP core design may be transmitted (e.g., via the Internet) over a wired connection 1950 or wireless connection 1960. The fabrication facility 1965 may then fabricate an integrated circuit that is based at least in part on the IP core design. The fabricated integrated circuit can be configured to perform operations in accordance with at least one embodiment described herein.

Exemplary System on a Chip Integrated Circuit

Figure 20:
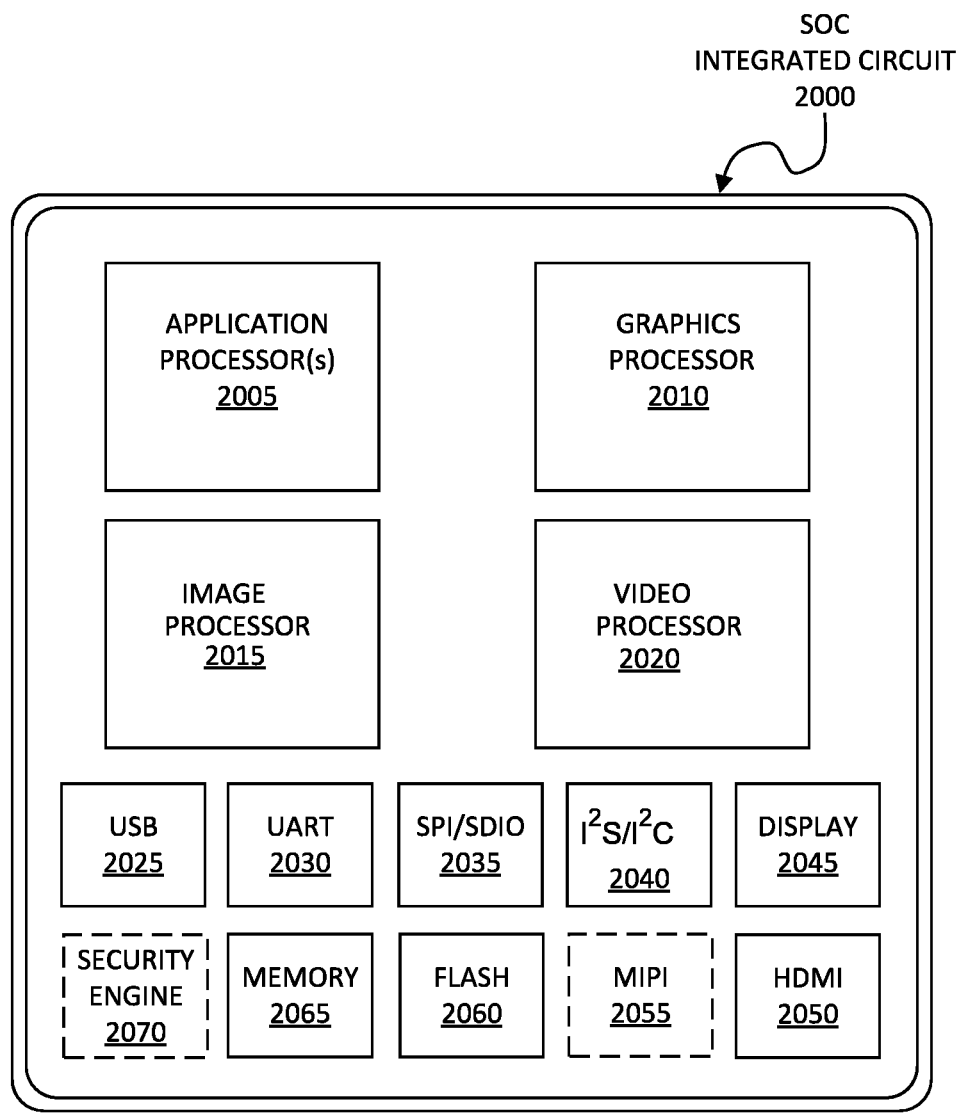
FIG. 20 is a block diagram illustrating an exemplary system on a chip integrated circuit that may be fabricated using one or more IP cores, according to an embodiment.
Figure 21:
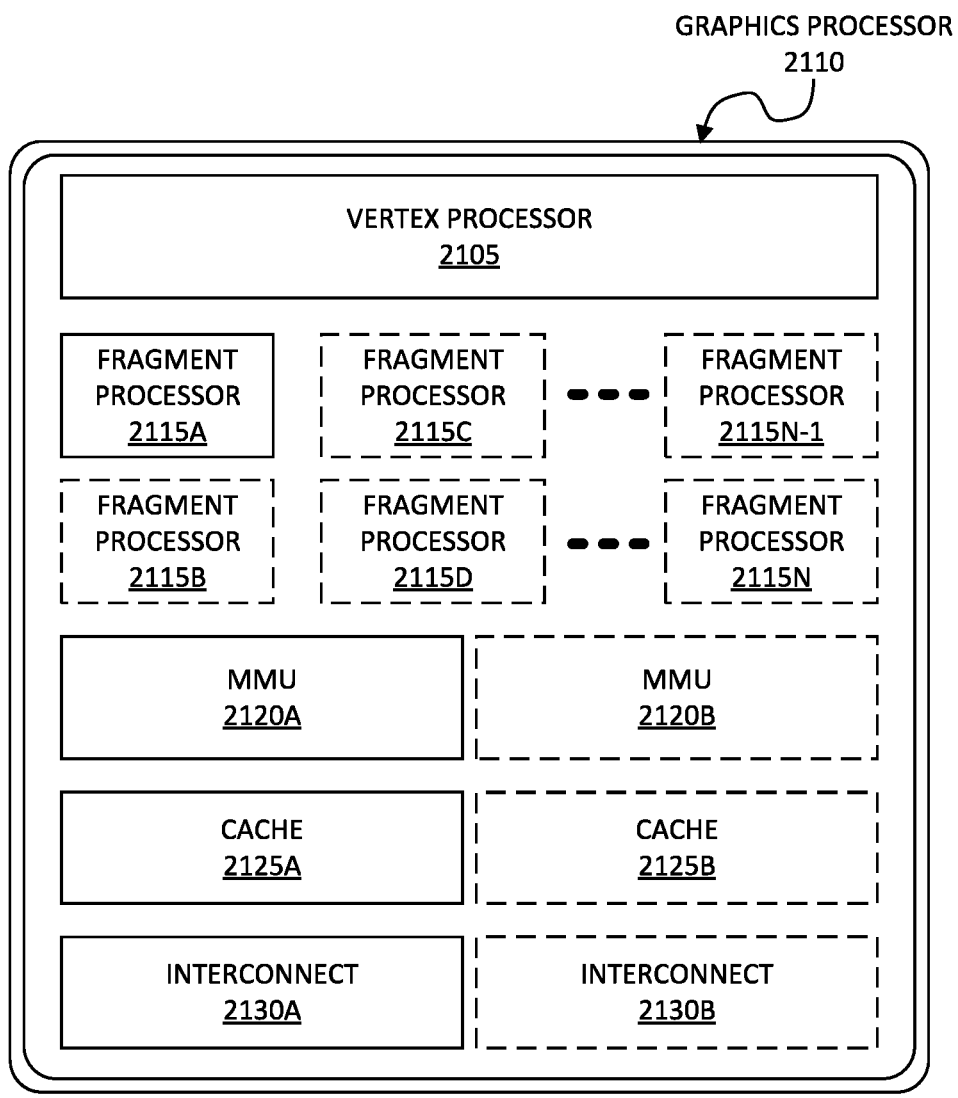
FIG. 21 is a block diagram illustrating an exemplary graphics processor of a system on a chip integrated circuit that may be fabricated using one or more IP cores, according to an embodiment.
Figure 22:
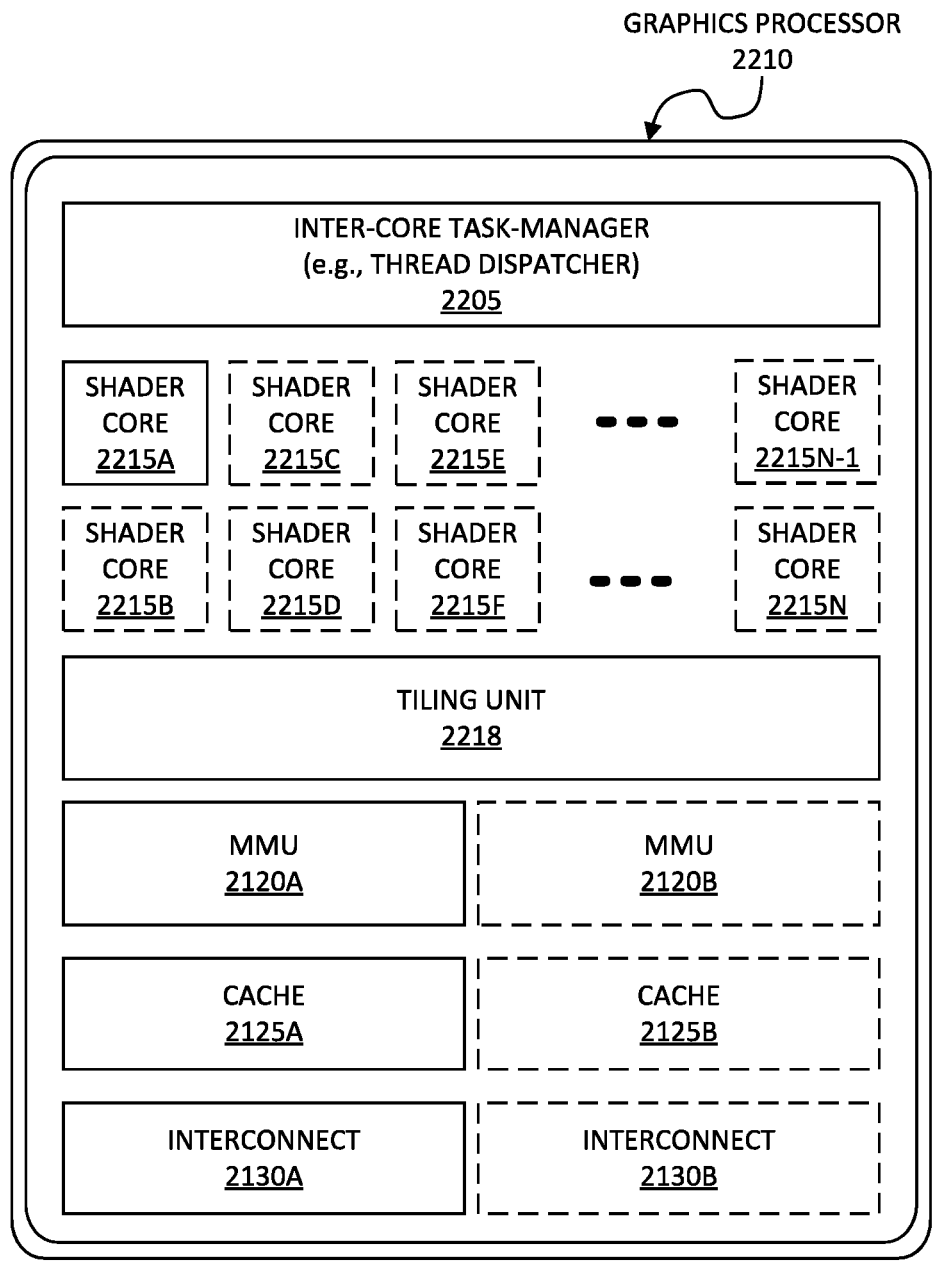
FIG. 22 is a block diagram illustrating an additional exemplary graphics processor of a system on a chip integrated circuit that may be fabricated using one or more IP cores, according to an embodiment.

FIGS. 20-22 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 20 is a block diagram illustrating an exemplary system on a chip integrated circuit 2000 that may be fabricated using one or more IP cores, according to an embodiment. Exemplary integrated circuit 2000 includes one or more application processor(s) 2005 (e.g., CPUs), at least one graphics processor 2010, and may additionally include an image processor 2015 and/or a video processor 2020, any of which may be a modular IP core from the same or multiple different design facilities. Integrated circuit 2000 includes peripheral or bus logic including a USB controller 2025, UART controller 2030, an SPI/SDIO controller 2035, and an $I^2S/I^2C$ controller 2040. Additionally, the integrated circuit can include a display device 2045 coupled to one or more of a high-definition multimedia interface (HDMI) controller 2050 and a mobile industry processor interface (MIPI) display interface 2055. Storage may be provided by a flash memory subsystem 2060 including flash memory and a flash memory controller. Memory interface may be provided via a memory controller 2065 for access to SDRAM or SRAM memory devices. Some integrated circuits additionally include an embedded security engine 2070.

Additionally, other logic and circuits may be included in the processor of integrated circuit 2000, including additional graphics processors/cores, peripheral interface controllers, or general purpose processor cores.

FIG. 21 is a block diagram illustrating an exemplary graphics processor 2110 of a system on a chip integrated circuit that may be fabricated using one or more IP cores, according to an embodiment. Graphics processor 2110 can be a variant of the graphics processor 2010 of FIG. 20. Graphics processor 2110 includes a vertex processor 2105 and one or more fragment processor(s) 2115A-2115N (e.g., 2115A, 2115B, 2115C, 2115D, through 2115N-1, and 2115N). Graphics processor 2110 can execute different shader programs via separate logic, such that the vertex processor 2105 is optimized to execute operations for vertex shader programs, while the one or more fragment processor(s) 2115A-2115N execute fragment (e.g., pixel) shading operations for fragment or pixel shader programs. The vertex processor 2105 performs the vertex processing stage of the 3D graphics pipeline and generates primitives and vertex data. The fragment processor(s) 2115A-2115N use the primitive and vertex data generated by the vertex processor 2105 to produce a framebuffer that is displayed on a display device. In one embodiment, the fragment processor(s) 2115A-2115N are optimized to execute fragment shader programs as provided for in the OpenGL API, which may be used to perform similar operations as a pixel shader program as provided for in the Direct 3D API.

Graphics processor 2110 additionally includes one or more memory management units (MMUs) 2120A-2120B, cache(s) 2125A-2125B, and circuit interconnect(s) 2130A-2130B. The one or more MMU(s) 2120A-2120B provide for virtual to physical address mapping for integrated circuit 2110, including for the vertex processor 2105 and/or fragment processor(s) 2115A-2115N, which may reference vertex or image/texture data stored in memory, in addition to vertex or image/texture data stored in the one or more cache(s) 2125A-2125B. In one embodiment the one or more MMU(s) 2125A-2125B may be synchronized with other MMUs within the system, including one or more MMUs associated with the one or more application processor(s) 1505, image processor 2015, and/or video processor 2020 of FIG. 20, such that each processor 2005-2020 can participate in a shared or unified virtual memory system. The one or more circuit interconnect(s) 2130A-2130B enable graphics processor 2110 to interface with other IP cores within the SoC, either via an internal bus of the SoC or via a direct connection, according to embodiments.

FIG. 22 is a block diagram illustrating an additional exemplary graphics processor 2210 of a system on a chip integrated circuit that may be fabricated using one or more IP cores, according to an embodiment. Graphics processor 2210 can be a variant of the graphics processor 2010 of FIG. 20. Graphics processor 2210 includes the one or more MMU(s) 2120A-2120B, caches 2125A-2125B, and circuit interconnects 2130A-2130B of the integrated circuit 2100 of FIG. 21.

Graphics processor 2210 includes one or more shader core(s) 2215A-2215N (e.g., 2215A, 2215B, 2215C, 2215D, 2215E, 2215F, through 2115N-1, and 2115N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2210 includes an inter-core task manager 2205, which acts as a thread dispatcher to dispatch execution threads to one or more shader cores 2215A-2215N and a tiling unit 2218 to accelerate tiling operations for tile-based rendering, in which rendering operations for a scene are subdivided in image space, for example to exploit local spatial coherence within a scene or to optimize use of internal caches.

Additional and Alternative Implementation Notes

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

In Example 1

A graphics processing unit (GPU), the GPU comprising: one or more graphics cores configured to process computer graphics, the one or more graphics cores being further configured to operate with a memory; the one or more graphics cores being further configured to: obtain metadata that specifies compression storage state of depth values of the pixel block, said pixel block including both normal and coverage samples; based on the obtained meta-data value, determine whether the pixel is stored with a separate depth per sample for the normal samples or is stored as Z-plane data covering one or more normal or coverage samples of the pixel, wherein the Z-plane data provides depths at sample locations.

In Example 2

A GPU as recited in Example 1, wherein the one or more graphics cores is further configured to specify a single pixel using a Z-plane together with a mask that specifies whether each sample in the pixel uses a clear depth or a depth derived from the Z-plane.

In Example 3

A GPU as recited in Example 1, wherein the one or more graphics cores is further configured to specify the block of pixels using two or more Z-planes together with a mask per sample that selects one of the Z-planes or a clear depth value.

In Example 4

A GPU as recited in Example 1, wherein the one or more graphics cores is further configured to specify a block of pixels using two or more Z-planes together with a mask per sample that selects one of the Z-planes or an invalid value, indicating that there is no depth value at that sample.

In Example 5

A GPU as recited in Example 1, wherein the one or more graphics cores is further configured to select Z-planes to discard based upon a Z-plane being associated with only coverage samples.

In Example 6

A GPU as recited in Example 5, wherein the one or more graphics cores is further configured to select storing a depth value per normal sample when a set of Z-planes that cover normal samples cannot be stored in a memory footprint of a compressed pixel.

In Example 7

A GPU as recited in Example 5, wherein the one or more graphics cores is further configured to: determine that block of pixels are capable of being stored using Z-planes; in response to that determination, compress and store Z-plane data.

In Example 8

A GPU as recited in Example 5, wherein the one or more graphics cores is further configured to: determine that the block of pixels are incapable of being stored using Z-planes; in response to that determination, divide the block of pixels and test recursively for when the divided block of pixels is capable being stored using Z-planes.

In Example 9

A GPU as recited in Example 5, wherein the one or more graphics cores is further configured to: determine that the block of pixels are incapable of being stored using Z-planes; in response to that determination, repeatedly divide the block of pixels until only a 1-pixel block remains; determine that the 1-pixel bock is incapable of being stored using Z-planes; storing depth values at normal samples.

In Example 10

A GPU as recited in Example 8, wherein the pixel block format is selected from a group consisting of Z-plane formats of 2×1 pixels per block, 2×2 pixels per block, and 4×4 pixels per block.

In Example 11

One or more computer-readable media storing instructions thereon that, when executed by one or more processors, direct the one or more processors to perform operations comprising: obtaining metadata that specifies compression storage state of depth values of the pixel block, said pixel block including both normal and coverage samples; based on the obtained meta-data value, determine whether the pixel is stored with a separate depth per sample for the normal samples or is stored as Z-plane data covering one or more normal or coverage samples of the pixel, wherein the Z-plane data provides depths at sample locations.

In Example 12

One or more computer-readable media of Example 11, wherein the operations further comprising specifying a single pixel using a Z-plane together with a mask that specifies whether each sample in the pixel uses a clear depth or a depth derived from the Z-plane.

In Example 13

One or more computer-readable media of Example 11, wherein the operations further comprising specifying the block of pixels using two or more Z-planes together with a mask per sample that selects one of the Z-planes or a clear depth value.

In Example 14

One or more computer-readable media of Example 11, wherein the operations further comprising specifying a block of pixels using two or more Z-planes together with a mask per sample that selects one of the Z-planes or an invalid value, indicating that there is no depth value at that sample.

In Example 15

One or more computer-readable media of Example 11, wherein the operations further comprising selecting Z-planes to discard based upon a Z-plane being associated with only coverage samples.

In Example 16

One or more computer-readable media of Example 15, wherein the operations further comprising storing a depth value per normal sample when a set of Z-planes that cover normal samples cannot be stored in a memory footprint of a compressed pixel.

In Example 17

One or more computer-readable media of Example 15, wherein the operations further comprising: determining that block of pixels are capable of being stored using Z-planes; in response to that determination, compressing and store Z-plane data.

In Example 18

One or more computer-readable media of Example 15, wherein the operations further comprising: determining that the block of pixels are incapable of being stored using Z-planes; in response to that determination, dividing the block of pixels and test recursively for when the divided block of pixels is capable being stored using Z-planes.

In Example 19

One or more computer-readable media of Example 15, wherein the operations further comprising: determining that the block of pixels are incapable of being stored using Z-planes; in response to that determination, repeatedly dividing the block of pixels until only a 1-pixel block remains; determining that the 1-pixel bock is incapable of being stored using Z-planes; storing depth values at normal samples.

In Example 20

One or more computer-readable media of Example 16, wherein the pixel block format is selected from a group consisting of Z-plane formats of 2×1 pixels per block, 2×2 pixels per block, and 4×4 pixels per block.

In Example 21

A computer graphics system comprising: a metadata handler configured to obtain metadata that specifies compression storage state of depth values of the pixel block, said pixel block including both normal and coverage samples; a depth manager configured to, based on the obtained metadata value, determine whether the pixel is stored with a separate depth per sample for the normal samples or is stored as Z-plane data covering one or more normal or coverage samples of the pixel, wherein the Z-plane data provides depths at sample locations.

In Example 22

A system of Example 21, wherein the Z-plane handler is further configured to specify a single pixel using a Z-plane together with a mask that specifies whether each sample in the pixel uses a clear depth or a depth derived from the Z-plane.

In Example 23

A system of Example 21, wherein the Z-plane handler is further configured to specify the block of pixels using two or more Z-planes together with a mask per sample that selects one of the Z-planes or a clear depth value.

In Example 24

A system of Example 21, wherein the Z-plane handler is further configured to specify a block of pixels using two or more Z-planes together with a mask per sample that selects one of the Z-planes or an invalid value, indicating that there is no depth value at that sample.

In Example 25

A system of Example 21, wherein the depth manager is further configured to select Z-planes to discard based upon a Z-plane being associated with only coverage samples.

In Example 26

A system of Example 25, wherein the depth manager is further configured to to select storing a depth value per normal sample when a set of Z-planes that cover normal samples cannot be stored in a memory footprint of a compressed pixel.

In Example 27

A system of Example 25, wherein the depth manager is further configured to: determine that block of pixels are capable of being stored using Z-planes; in response to that determination, compress and store Z-plane data.

In Example 28

A system of Example 25, wherein the depth manager is further configured to: determine that the block of pixels are incapable of being stored using Z-planes; in response to that determination, divide the block of pixels and test recursively for when the divided block of pixels is capable being stored using Z-planes.

In Example 29

A system of Example 25, wherein the depth manager is further configured to: determine that the block of pixels are incapable of being stored using Z-planes; in response to that determination, repeatedly divide the block of pixels until only a 1-pixel block remains; determine that the 1-pixel bock is incapable of being stored using Z-planes; storing depth values at normal samples.

In Example 30

A system of Example 27, wherein the pixel block format is selected from a group consisting of Z-plane formats of 2×1 pixels per block, 2×2 pixels per block, and 4×4 pixels per block.

What is claimed is:

1. A graphics processor comprising:
a memory; and
one or more graphics cores configured to operate with the memory to process computer graphics to:
obtain metadata that specifies compression storage state of depth values of a pixel block, the pixel block including both normal and coverage samples;
based on the obtained meta-data value, determine whether a pixel is stored with a separate depth per sample for the normal samples or is stored as Z-plane data covering one or more normal or coverage samples of the pixel, wherein the Z-plane data provides depths derived from one or more Z-planes at sample locations;
select Z-planes to discard based upon a Z-plane being associated with only coverage samples;
determine whether the pixel block is capable of being stored using the one or more Z-planes;
when the pixel block is determined as being capable, compress and store the Z-plane data; and
when the pixel block is determined as being incapable, divide the pixel block and test recursively to determine when the divided pixel block becomes capable of being stored using the one or more Z-planes or only a 1-pixel block remains.

2. The graphics processor as recited in claim 1, wherein the one or more graphics cores is further configured to specify a single pixel using a Z-plane of the one or more Z-planes together with a mask that specifies whether each sample in the pixel uses a clear depth or the depth derived from the Z-plane.

3. The graphics processor as recited in claim 1, wherein the one or more graphics cores is further configured to specify the pixel block using two or more Z-planes of the one or more Z-planes together with a mask per sample that selects one of the used Z-planes or a clear depth value.

4. The graphics processor as recited in claim 1, wherein the one or more graphics cores is further configured to specify the pixel block using two or more of the one or more Z-planes together with a mask per sample that selects one of the used Z-planes or an invalid value, indicating that there is no depth value at that sample.

5. The graphics processor as recited in claim 1, wherein the one or more graphics cores is further configured to store a depth value per normal sample when a set of Z-planes that cover normal samples cannot be stored in a memory footprint of a compressed pixel.

6. The graphics processor as recited in claim 1, wherein the one or more graphics cores is further configured to:
determine that the block of pixels are incapable of being stored using Z-planes;
in response to that determination, repeatedly divide the block of pixels until only a 1-pixel block remains;
when only the 1-pixel block remains, determine that the 1-pixel bock is incapable of being stored using one or more Z-planes; and
store depth values at normal samples.

7. The graphics processor as recited in claim 1, wherein a pixel block format is selected from a group consisting of Z-plane formats of 2×1 pixels per block, 2×2 pixels per block, and 4×4 pixels per block.

8. One or more non-transitory computer-readable media storing instructions thereon that, when executed by one or more processors, direct the one or more processors to perform operations comprising:
obtaining metadata that specifies compression storage state of depth values of a pixel block, the pixel block including both normal and coverage samples; and
based on the obtained meta-data value, determining whether a pixel is stored with a separate depth per sample for the normal samples or is stored as Z-plane data covering one or more normal or coverage samples of the pixel, wherein the Z-plane data provides depths derived from one or more Z-planes at sample locations;
selecting Z-planes to discard based upon a Z-plane being associated with only coverage samples;
determining whether the pixel block is capable of being stored using the one or more Z-planes;
when the pixel block is determined as being capable, compressing and storing the Z-plane data; and
when the pixel block is determined as being incapable, dividing the pixel block and testing recursively to determine when the divided pixel block becomes capable of being stored using the one or more Z-planes or only a 1-pixel block remains.

9. The one or more non-transitory computer-readable media of claim 8, the operations further comprising:
specifying a single pixel using a Z-plane of the one or more Z-planes together with a mask that specifies whether each sample in the pixel uses a clear depth or the depth derived from the Z-plane.

10. The one or more non-transitory computer-readable media of claim 8, the operations further comprising:
specifying the pixel block using two or more Z-planes of the one or more Z-planes together with a mask per sample that selects one of the used Z-planes or a clear depth value.

11. The one or more non-transitory computer-readable media of claim 8, the operations further comprising:
specifying the pixel block using two or more Z-planes of the one or more Z-planes together with a mask per sample that selects one of the used Z-planes or an invalid value, indicating that there is no depth value at that sample.

12. The one or more non-transitory computer-readable media of claim 8, the operations further comprising:
selecting Z-planes to discard based upon a Z-plane being associated with only coverage samples.

13. The one or more non-transitory computer-readable media of claim 12, the operations further comprising:
storing a depth value per normal sample when a set of Z-planes that cover normal samples cannot be stored in a memory footprint of a compressed pixel.

14. A computer graphics system comprising:
a memory; and
a graphics processor, the graphics processor configured to:
obtain metadata that specifies compression storage state of depth values of a pixel block, the pixel block including both normal and coverage samples;
based on the obtained metadata value, determine whether a pixel is stored with a separate depth per sample for the normal samples or is stored as Z-plane data covering one or more normal or coverage samples of the pixel, wherein the Z-plane data provides depths derived from one or more Z-planes at sample locations; and select Z-planes to discard based upon a Z-plane being associated with only coverage samples, determine whether the pixel block is capable of being stored using the one or more Z-planes, when the pixel block is determined as being capable, compress and store the Z-plane data, and when the pixel block is determined as being incapable, divide the pixel block and test recursively to determine when the divided pixel block becomes capable of being stored using the one or more Z-planes or only a 1-pixel block remains.

15. The system of claim 14, wherein the graphics processor is further configured to specify a single pixel using a Z-plane of the one or more Z-planes together with a mask that specifies whether each sample in the pixel uses a clear depth or the depth derived from the used Z-plane.

16. The system of claim 14, wherein the graphics processor is further configured to specify the pixel block using two or more Z-planes of the one or more Z-planes together with a mask per sample that selects one of the used Z-planes or a clear depth value.

17. The system of claim 14, wherein the graphics processor is further configured to specify the pixel block using two or more Z-planes of the one or more Z-planes together with a mask per sample that selects one of the used Z-planes or an invalid value, indicating that there is no depth value at that sample.

* * * * *